(12) United States Patent
Navarro Arranz et al.

(10) Patent No.: US 11,560,116 B2
(45) Date of Patent: Jan. 24, 2023

(54) VEHICLE PASSENGER RESTRAINT SYSTEM COMPRISING AN AIRBAG MODULE

(71) Applicant: Dalphi Metal Espana, S.A., Vigo (ES)

(72) Inventors: Antonio Navarro Arranz, Valladolid (ES); Ramon Ramos Agustin, Viana de Cega (ES)

(73) Assignee: DALPHI METAL ESPANA S.A., Vigo (ES)

( * ) Notice: Subject to any disclaimer, the term of this patent is extended or adjusted under 35 U.S.C. 154(b) by 0 days.

(21) Appl. No.: 16/649,722

(22) PCT Filed: Oct. 8, 2018

(86) PCT No.: PCT/EP2018/077331
§ 371 (c)(1),
(2) Date: Mar. 23, 2020

(87) PCT Pub. No.: WO2019/076669
PCT Pub. Date: Apr. 25, 2019

(65) Prior Publication Data
US 2020/0254959 A1    Aug. 13, 2020

(30) Foreign Application Priority Data

Oct. 20, 2017   (DE) .......................... 102017124577.4

(51) Int. Cl.
*B60R 21/237*        (2006.01)
*B60R 21/214*        (2011.01)
(Continued)

(52) U.S. Cl.
CPC .......... *B60R 21/237* (2013.01); *B60R 21/206* (2013.01); *B60R 21/214* (2013.01);
(Continued)

(58) Field of Classification Search
CPC ... B60R 21/237; B60R 21/206; B60R 21/214; B60R 21/231; B60R 21/2338;
(Continued)

(56) References Cited

U.S. PATENT DOCUMENTS 5,730,463 A     3/1998 Fisher et al.
10,328,886 B2   6/2019 Peyre et al.
(Continued)

FOREIGN PATENT DOCUMENTS

DE   102006055037        6/2008
DE   102014005824 A1 * 10/2015 ......... B60R 21/2338
(Continued)

OTHER PUBLICATIONS

Definition of "between"; https://www.thefreedictionary.com/between; Jul. 27, 2021.*

*Primary Examiner* — Keith J Frisby
(74) *Attorney, Agent, or Firm* — Tarolli, Sundheim, Covell & Tummino LLP

(57) ABSTRACT

A vehicle occupant restraint system comprises an airbag module (12) which includes an airbag (16) as well as an inflator (18) which upon activation supplies filling gas for the airbag (16). The airbag (16) is folded prior to activation into an airbag package (14) so that a main package (48) which contains a restraint part (52) of the airbag (16) constituting a major part of the airbag volume as well as a connecting portion (50) is formed which comprises a neck (54) of the airbag (16) connecting the restraint part (52) to the inflator (18), wherein the restraint part (52) is folded differently from the neck (54).

10 Claims, 23 Drawing Sheets

(51) Int. Cl.
*B60R 21/231* (2011.01)
*B60R 21/2338* (2011.01)
*B60R 21/206* (2011.01)
*B60R 21/00* (2006.01)

(52) U.S. Cl.
CPC ........ *B60R 21/231* (2013.01); *B60R 21/2338* (2013.01); *B60R 2021/0051* (2013.01); *B60R 2021/23169* (2013.01); *B60R 2021/23388* (2013.01)

(58) Field of Classification Search
CPC .......... B60R 21/213; B60R 2021/0051; B60R 2021/23169; B60R 2021/23388; B60R 2021/23382; B60R 2021/23384; B60R 2021/23386
USPC .............................................. 280/732, 743.2
See application file for complete search history.

(56) References Cited

U.S. PATENT DOCUMENTS

| | | |
|---|---|---|
| 2002/0024200 A1 | 2/2002 | Eckert et al. |
| 2005/0070414 A1 | 3/2005 | Schneider et al. |
| 2012/0205898 A1 | 8/2012 | Picard et al. |
| 2013/0099466 A1 | 4/2013 | Kim et al. |
| 2013/0113190 A1 | 5/2013 | Schneider et al. |
| 2014/0159353 A1 | 6/2014 | Stemp |
| 2017/0043738 A1* | 2/2017 | Peyre .................... B60R 21/214 |
| 2017/0113646 A1 | 4/2017 | Lee et al. |
| 2017/0174173 A1 | 6/2017 | Peyre et al. |
| 2017/0210328 A1* | 7/2017 | Schuler ............... B60R 21/2338 |

FOREIGN PATENT DOCUMENTS

| | | |
|---|---|---|
| DE | 102014005827 | 10/2015 |
| WO | 2019076669 | 4/2019 |

* cited by examiner

VEHICLE PASSENGER RESTRAINT SYSTEM COMPRISING AN AIRBAG MODULE

CROSS-REFERENCE TO RELATED APPLICATIONS

This application is a U.S. National Stage Application filed under 35 U.S.C. § 371 of PCT/EP2018/077331, filed Oct. 8, 2018, and entitled VEHICLE OCCUPANT RESTRAINT SYSTEM COMPRISING AIRBAG MODULE, which International Application claims the benefit of priority from German Patent Application No. 10 2017 124 577.4, filed on Oct. 20, 2017. The entire contents of each of the above-identified patent applications are incorporated herein by reference.

BACKGROUND OF THE INVENTION

The invention relates to a vehicle occupant restraint system comprising an airbag module.

For protecting the vehicle occupants, very successfully airbags have been employed. They develop the best protective effect when the vehicle occupant to be absorbed is located in a defined position relative to the inflated airbag. With large-volume airbags of complex shape care has to be taken that they deploy in the vehicle interior in a precise and reproducible manner.

SUMMARY OF THE INVENTION

Therefore, it is the object of the invention to improve the deployment behavior of an airbag.

This object is achieved by a vehicle occupant restraint system comprising the features of claim 1. The vehicle occupant restraint system comprises an airbag module including an airbag as well as an inflator which upon activation supplies filling gas for the airbag, wherein prior to activation the airbag is folded to form an airbag package so that a main package which contains a restraint part of the airbag forming a major part of the airbag volume as well as a connecting portion is formed which comprises a neck of the airbag connecting the restraint part to the inflator, with the restraint part being folded differently from the connecting portion. This division of different portions of the airbag into different package portions allows filling, upon activation of the inflator, at first the neck which then moves the main package still being at least partially folded into the vehicle interior. Thus, the main package can be moved into the vehicle interior already before it has completely deployed, and the airbag does not inadvertently contact lining parts or other components in the vehicle interior.

The neck is advantageously folded into one to three zigzag folds so that the neck will linearly stretch when gas flows from the inflator into the connecting portion.

In the deployed and inflated airbag, the neck is preferably narrower than the restraint part, when viewed in the transverse vehicle direction. It is sufficient for the neck to be only slightly wider than the inflator and significantly shorter than the restraint part of the airbag, when viewed in the longitudinal vehicle direction. The neck normally does not contribute to the restraining effect of the airbag so that in this respect material, space and filling volume may be saved.

The main package may be wider than the length of the inflator so that in a longitudinal airbag module direction extending from the inflator to the airbag package the length of the airbag module is shorter than its width.

In order to obtain a linear thrust effect, the folded connecting portion is advantageously disposed between the inflator and the main package. The inflator, the connecting portion and the main package are advantageously located along a straight line along the longitudinal module direction.

The connecting portion and the main package can be folded and arranged in the airbag package in such manner that the main package will not deploy before it is completely located in the vehicle interior.

The stretched connecting portion, i.e. the neck, may have a length of from about 5 cm to 50 cm, especially from 15 cm to 50 cm.

The length of the neck should be selected to be sufficient for sliding the main package of the airbag package preferably completely into the vehicle interior. In a second function, the neck may ensure that the restraint part of the airbag is placed at the position provided for the same inside the vehicle interior when it is completely inflated. Those skilled in the art may derive the optimum length of the neck from these two parameters.

In order to additionally influence the deployment of the airbag in the vehicle interior, the airbag may include a first free end delimiting the restraint part, wherein the first free end is fixed, prior to activating the inflator, in the area of the inflator via a tether having a weakened zone, and the tether is intact at least until the neck is completely filled with gas. In this way, the deployment behavior can be influenced even when the main package is already located in the vehicle interior. Starting from a particular tensile force, the tether will become detached for example by splitting at the weakened zone, and the airbag may take its final inflated shape.

The restraint part of the airbag in the main package may be both folded and rolled so that a well-directed control of the deployment is possible even with a complex airbag shape.

In a preferred embodiment, the airbag is a passenger airbag, with the airbag module being arranged beneath a roof liner of the vehicle in the area of a sun visor. The airbag then deploys out of the roof liner and, in the inflated state, is located in the space between a windshield and the vehicle occupant, wherein the airbag also extends over an instrument panel and the first end may form a lower end of a baffle for the vehicle occupant.

In a possible configuration of the invention, the vehicle occupant restraint system comprises an airbag module which is mounted in the area of the roof liner of the vehicle on the passenger side approximately centrally with respect to the passenger seat, when viewed in the transverse vehicle direction, and includes an airbag folded into an airbag package which, in the case of restraint, deploys between the windshield and the passenger so as to frontally absorb the passenger. The airbag package is disposed e.g. between the pivot axis of the sun visor and the windshield of the vehicle.

In another preferred embodiment, the airbag is a knee airbag disposed in the lower zone of an instrument panel or beneath the latter. In this case, the airbag deploys along the instrument panel and, resp., the steering column lining in the direction of the passenger compartment.

As a matter of course, the principle according to the invention may be also applied to airbags at other positions within the vehicle, for example in a backrest.

In general, the inflator is preferably arranged in the airbag module so that its longitudinal axis is perpendicular to the longitudinal module direction of the airbag module, with the longitudinal module direction in the mounted state of the airbag module coinciding with a deployment direction of the airbag out of the airbag module and approximately pointing in the longitudinal vehicle direction.

The inflator is inserted directly in the inflation end of the airbag and is tightly connected to the airbag by two opposite tabs of the airbag with fastening holes formed therein being pulled over fastening bolts projecting from the inflator and thus sealing the inflation opening in a gastight manner.

For fastening the airbag module to the roof rail, if the airbag module is a passenger front module, the inflator is accommodated in a mount C-shaped in cross-section of a module carrier fastened on the roof rail, wherein the arm of the C-shaped mount on the vehicle interior side does not substantially project from the inflator.

The main package is folded, for example, so that the first free end is folded back to the inflation end. Moreover, the two lateral portions of the restraint part are folded back to the center and are subsequently rolled up. In this way it is achieved that first an outer leg of the airbag is filled which extends from the inflation end to a second free end of the airbag located in the inflated state approximately in the transition from the windshield to the instrument panel. On the other hand, the filling gas initially does not yet flow substantially into an inner leg of the airbag which extends from the inflation end to the first free end of the airbag. This is achieved by the folding of the restraint part of the airbag and by the tether.

From a particular fill level, which is reached after a predetermined first period after activation of the inflator, the tether becomes detached due to the active tensile forces, and also the inner leg of the airbag and the first free end of the airbag are completely inflated.

In the completely inflated state of the airbag, the first free end extends beyond the instrument panel toward the vehicle occupant, and between the first free end and the inflator-side inflation end of the airbag a baffle is formed on the side facing the vehicle occupant.

Preferably, the airbag is substantially composed of three outer wall portions whose first outer wall portion extends from the inflation end to the second free end and forms a bearing face for bearing against the windshield. The second outer wall portion connects the first free end to the second free end and in the inflated state rests on and above the instrument panel, and the third outer wall portion connects the first free end to the inflation end and, in the inflated state, forms the baffle.

The folded airbag package is accommodated together with the inflator in a wrapping which is fastened on the inflator side via two retaining tabs to the fastening bolts of the inflator, whereas the main package of the folded airbag package is put into a holding bag and is retained there via an airbag package fixation formed on the wrapping. The airbag package fixation includes meshing first and second fixing elements which form a plug connection and both of which are formed exclusively from the material of the wrapping, especially from an airbag fabric. The connecting portion is located outside the holding bag and is fixed by the retaining tabs in the folded state. For fixation on the vehicle, the wrapping has one or more fixing portions which also facilitate prefixing to the vehicle body allowing the airbag module to be exactly positioned and the load-bearing fixations to be conveniently attached.

In the bottom of the holding bag of the wrapping a weakened zone is provided, for example, through which the main package of the folded airbag package may leave the airbag module and may deploy out of the roof liner into the vehicle interior.

All features described in connection with the invention can also individually be realized independently of each other or in any suitable combinations being at the discretion of those skilled in the art.

BRIEF DESCRIPTION OF THE DRAWINGS

Hereinafter, the invention shall be described in detail by way of an embodiment with reference to the enclosed Figures, wherein.

DESCRIPTION

Figure 1:
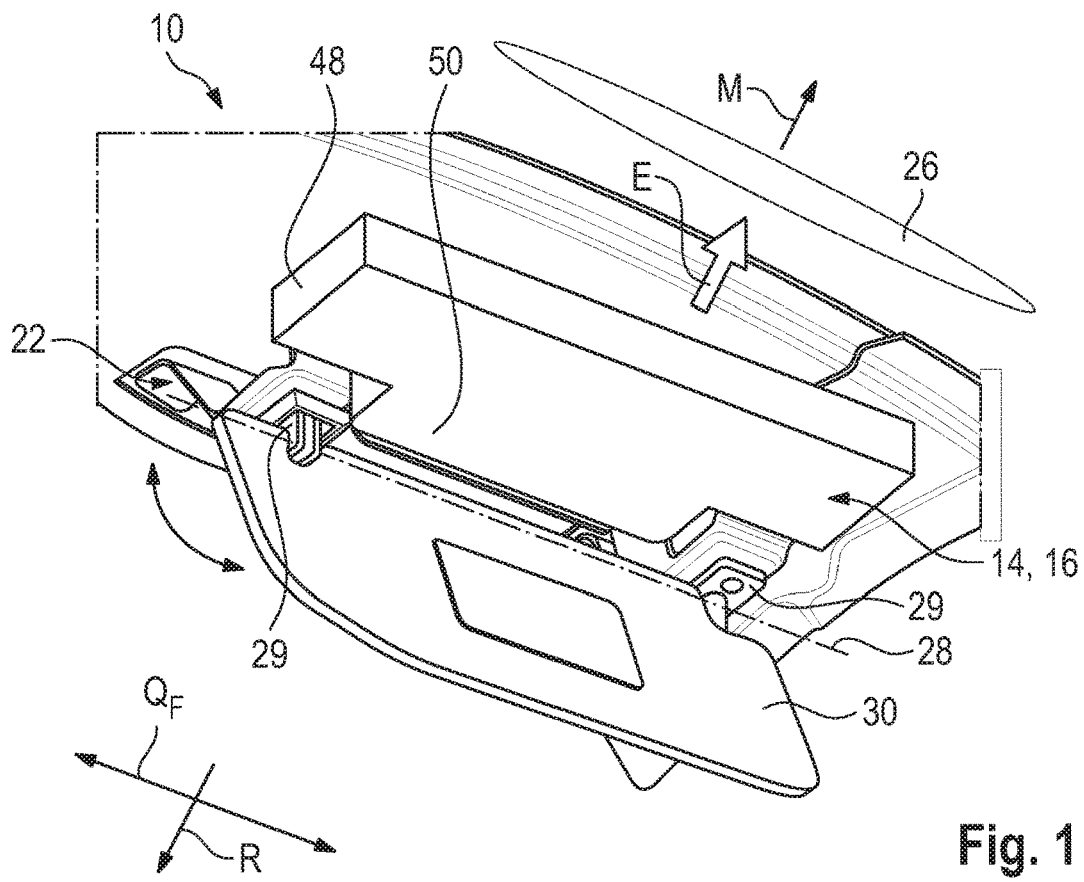
FIG. 1 shows a schematic perspective view of a vehicle occupant restraint system according to the invention comprising an airbag module mounted on a roof of the vehicle.
Figure 2:
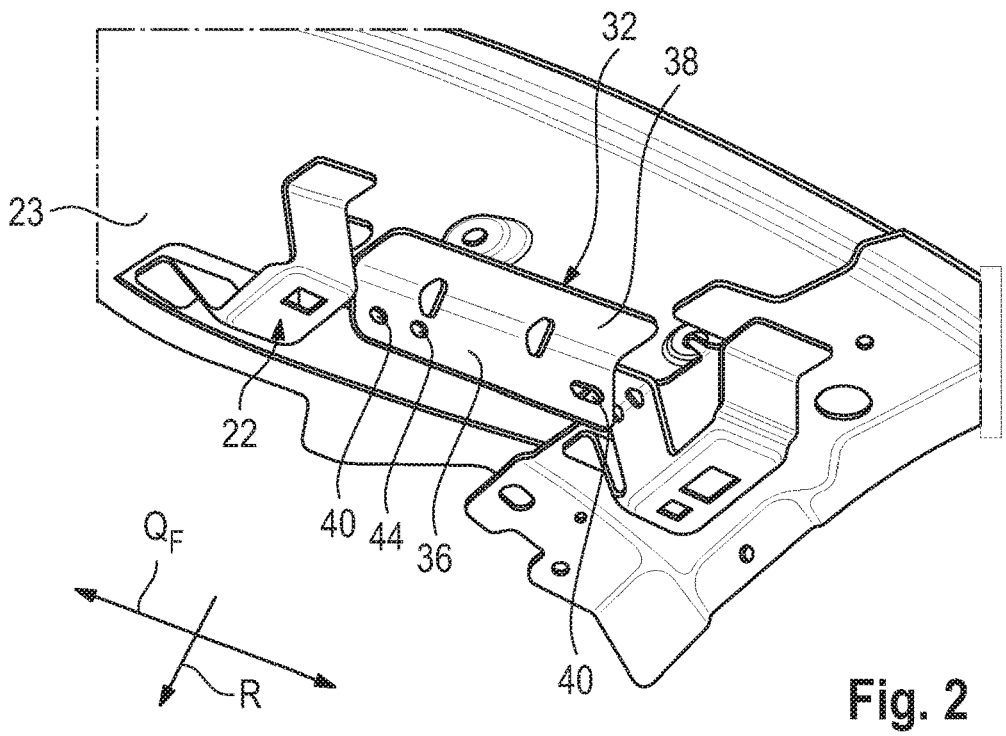
FIG. 2 shows a module carrier of the airbag module of FIG. 1 mounted on the vehicle roof.
Figure 3:
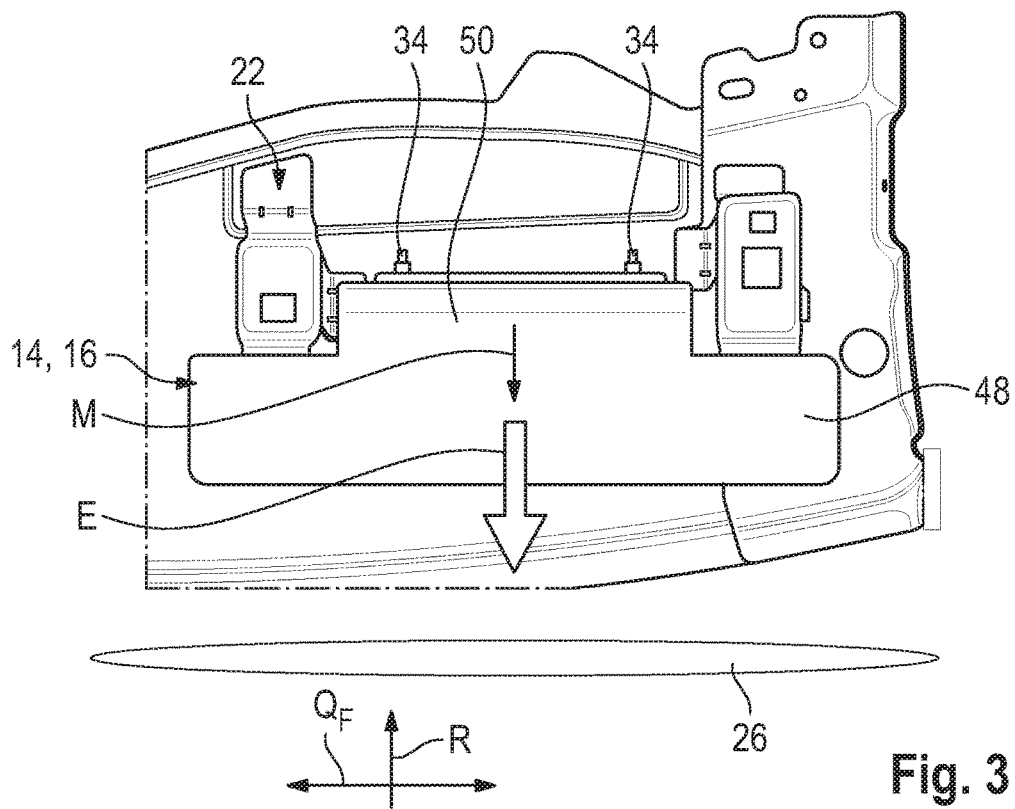
FIG. 3 shows a top view onto the airbag module of FIG. 1.
Figure 4:
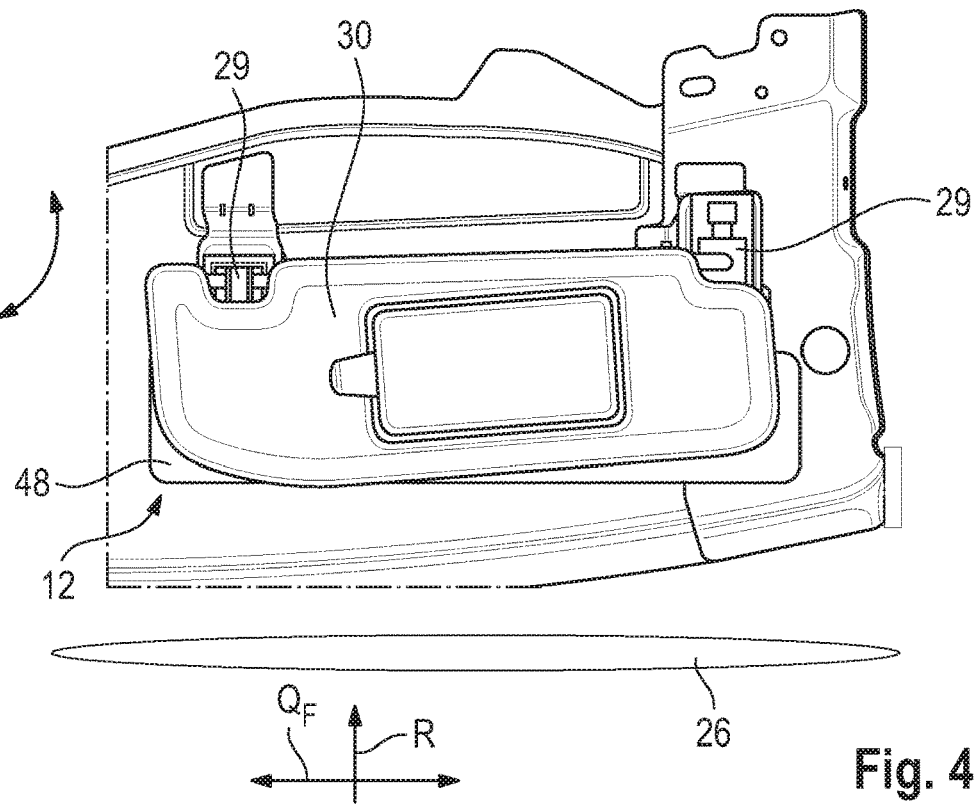
FIG. 4 shows the representation of FIG. 3 where additionally the sun visor is illustrated.
Figure 5:
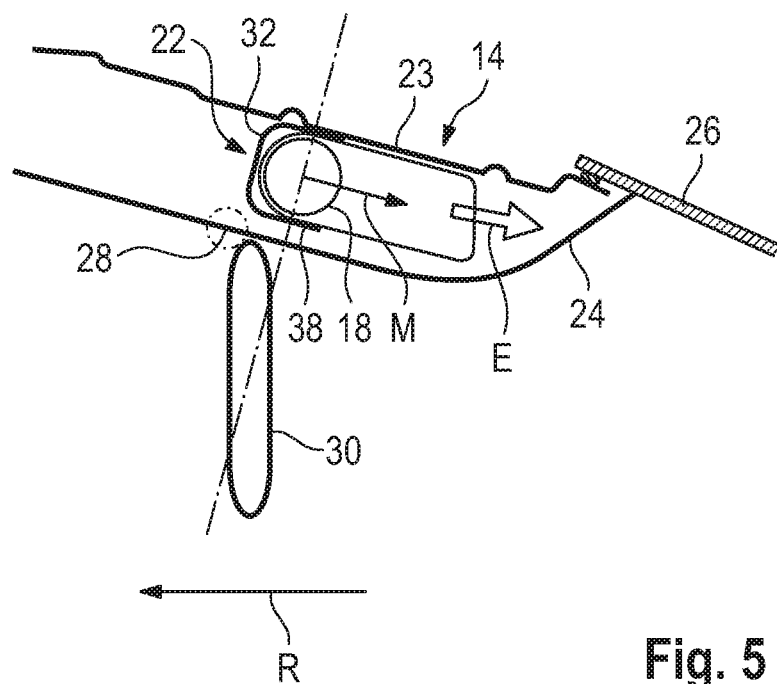
FIG. 5 shows a schematic sectional view of the vehicle occupant restraint system of FIG. 1 installed in the vehicle.
Figure 6:
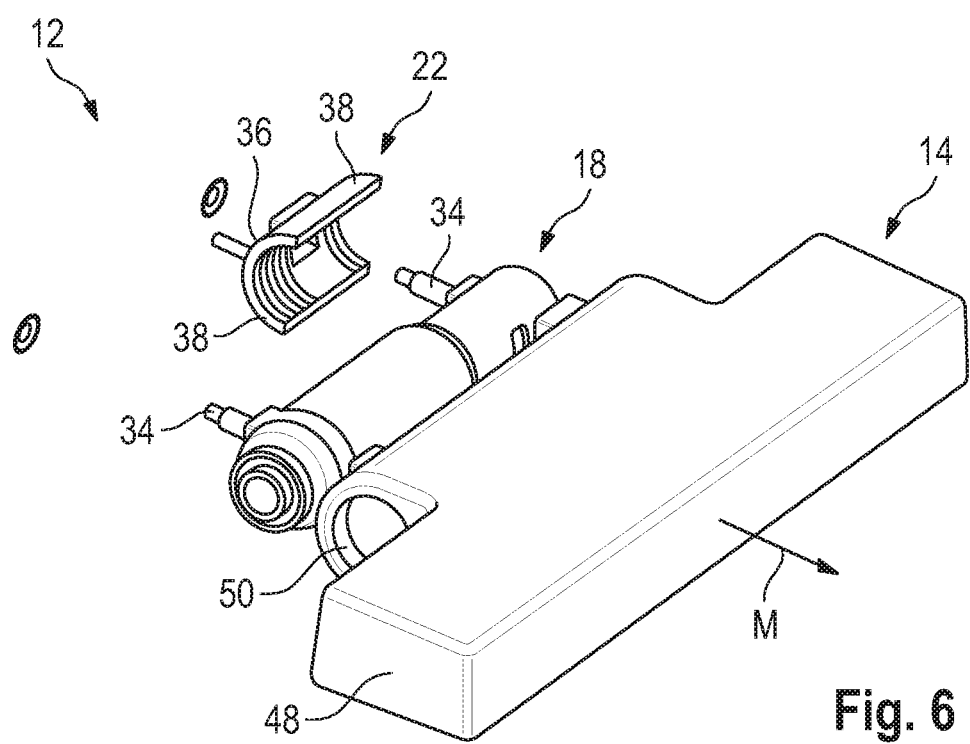
FIG. 6 shows a schematic exploded view of the airbag module of FIG. 1.

FIGS. 1 to 7 illustrate the structure of a vehicle occupant restraint system 10 which in this example is designed to protect a passenger especially of a passenger car during frontal crash.

The vehicle occupant restraint system 10 comprises an airbag module 12 (cf. especially FIGS. 5 to 7) including a frontally acting airbag 16 folded into an airbag package 14 as well as an inflator 18 which supplies filling gas for inflating the airbag 16. The inflator 18 is inserted in the airbag 16 and thus integrated in the airbag package 14.

Figure 29:
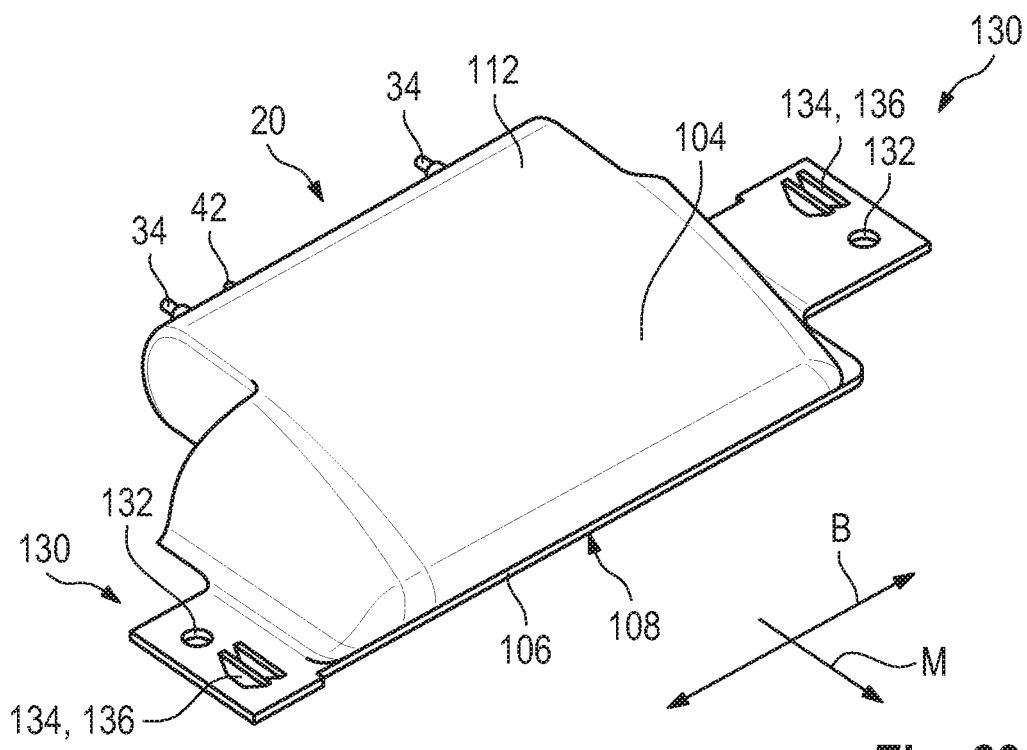
FIG. 29 shows a schematic perspective representation of the airbag package of FIG. 28 inserted in a wrapping.

The airbag package 14 and the inflator 18 are accommodated in a flexible wrapping 20 (see e.g. FIGS. 7 and 29) which will be described in detail further below and which has been omitted in FIGS. 1 to 6 for reasons of clarity.

Further, a module carrier 22 is provided (see FIGS. 2 and 6, for instance) via which the airbag module 12 is mounted tightly to the vehicle, for example to a roof rail 23 or any other rigid component in the roof area of the vehicle. The module carrier 22 is a formed sheet part, for example.

The airbag module 12 is arranged beneath a roof liner 24 (cf. e.g. FIG. 5), wherein it is located, when viewed along the longitudinal vehicle direction R, between a windshield 26 of the vehicle and a pivot axis 28 and, resp., the attachments 29 of a sun visor 30. The sun visor 30 may be pivoted about the pivot axis 28 as indicated e.g. in FIG. 1. The pivot axis 28 is not continuously physically realized. Instead, the sun visor 30 is pivotally attached to the roof liner by two attachments 29 (see FIGS. 1 and 4), wherein usually the sun visor 30 may be unhooked at the vehicle inward one of the two attachments 29 so as to laterally fold away the sun visor.

At least the folded airbag package 14 and, where appropriate, also the inflator 18 is/are located, when viewed in the vehicle direction R from the vehicle front end to the vehicle rear end, ahead of the pivot axis 28 of the sun visor 30.

A deployment direction E of the airbag 16 is directed along the longitudinal vehicle direction R in the direction of the vehicle front end and initially extends approximately in parallel to the vehicle roof and the windshield 26.

The airbag module 12 is located, when viewed in the transverse vehicle direction $Q_F$, on the passenger side approximately centrally above a passenger seat (not shown) so that the airbag 16 is capable of frontally absorbing the passenger. The airbag module 12 thus is disposed in the transverse vehicle direction $Q_F$ distant from the vehicle doors.

The module carrier 22 includes a holder 32 C-shaped in cross-section and encompassing the inflator 18 at the inflator-side end side of the airbag package 14.

The inflator 18 in this case is a known elongate tubular inflator, with two fastening bolts 34 radially projecting from the cylindrical outside thereof. The fastening bolts 34 are located on a rear side of the inflator 18, on the opposite front side discharge orifices (not shown) are provided through which the filling gas leaves the inflator 18 and flows directly into the airbag 16.

The inflator 18 is disposed in the airbag module 12 so that its longitudinal axis extends transversely to the longitudinal vehicle direction R approximately in the transverse vehicle direction OF and thus approximately normal to a longitudinal module direction M and the deployment direction E of the airbag 16. The longitudinal module direction M can be defined approximately by an extension of a diameter of the inflator 18 which is determined by the fastening bolts 34.

In the module carrier 22, more exactly speaking in a longitudinal side 36 of the C-shaped holder 32 located between the two arms 38 of the C shape, fastening holes 40 (cf. FIG. 2) are provided through which the fastening bolts 34 are passing so as to fasten the inflator 18 and the airbag package 14 tightly to the module carrier 22. On the rear side, the fastening bolts 34 may be secured by nuts, for example.

Figure 7:
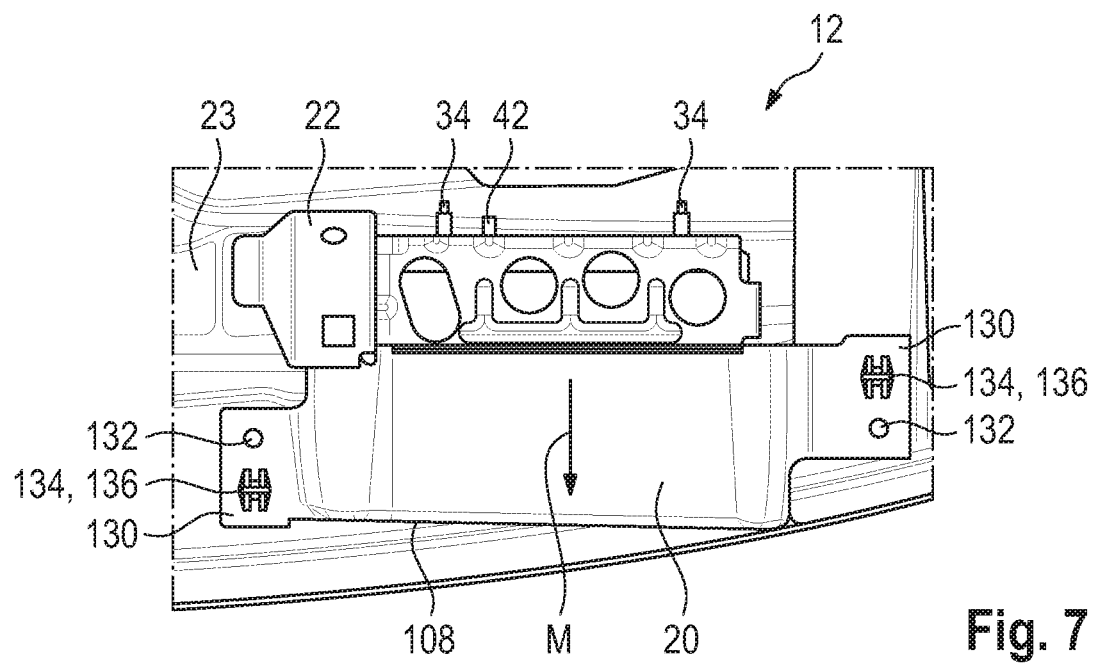
FIG. 7 shows a schematic top view onto the airbag module of FIG. 1 mounted on the roof.

In addition to the two fastening bolts 34, another bolt constituting a positioning bolt 42 is provided (see e.g. FIG. 7). A corresponding hole 44 is provided in the module carrier 22 (see FIG. 2). According to the Poka-Yoke principle, said positioning bolt 42 serves for preventing faulty assembly of the inflator 18.

Upon deployment of the airbag 16, filling gas flows from the inflator 18 into the airbag 16 through an inflation end 46 which is fastened on the inflator 18 as will be described in detail below. The pressure of the filling airbag 16 helps open the roof liner 24 either at a weakened zone or, for example, at the transition to the windshield 26 and allows the airbag 16 to get out into the vehicle interior. Accordingly, the roof liner 24 forms a lower delimitation of a passage for the airbag 16. An upper delimitation of said passage may be predefined by the roof rail 23. In this example, no further rigid guiding part such as a guiding plate is provided between the airbag 16 and the roof liner 24.

The arm 38 of the C-shaped holder 32 on the vehicle interior side does not extend, in the longitudinal vehicle direction R, beyond the outer wall of the inflator 18 and merely increases the stability of the module carrier 22 so that the latter deforms only insignificantly during deployment of the airbag 16, but does not contribute to directing the airbag 16 by directly contacting the airbag 16.

Due to its position on the roof rail 23, the deploying airbag 16 does not contact the sun visor 30 or the attachments 29 thereof, either, while it moves out into the vehicle interior.

Figure 8:
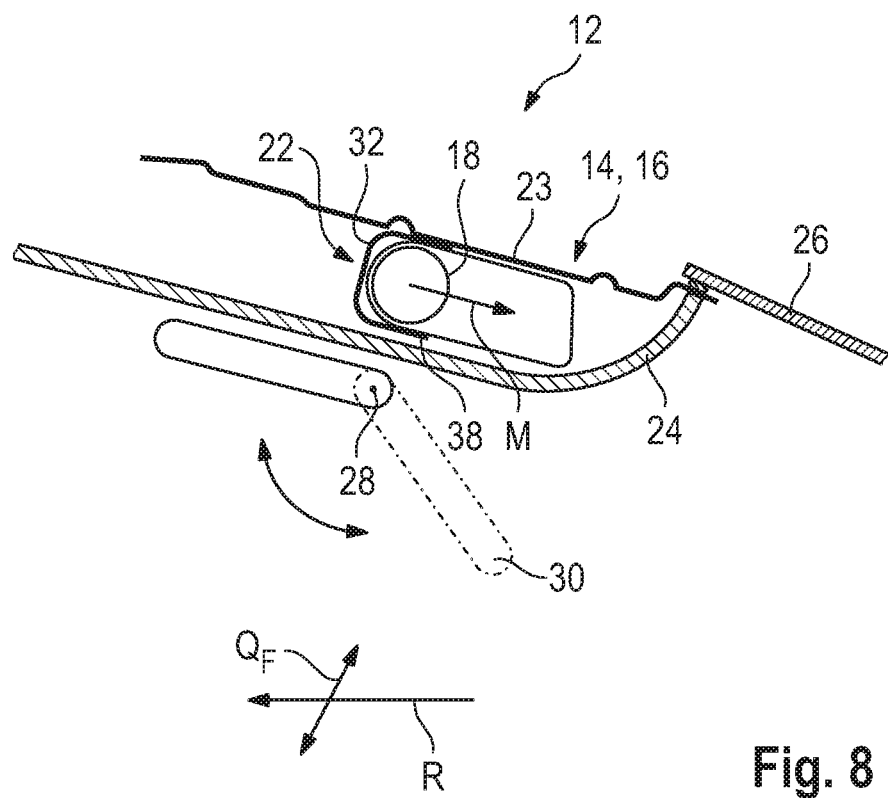
FIGS. 8 and 9 show the vehicle occupant restraint system of FIG. 1 in a schematic sectional view prior to deployment of the airbag and during the initial deployment phase of the airbag.
Figure 9:
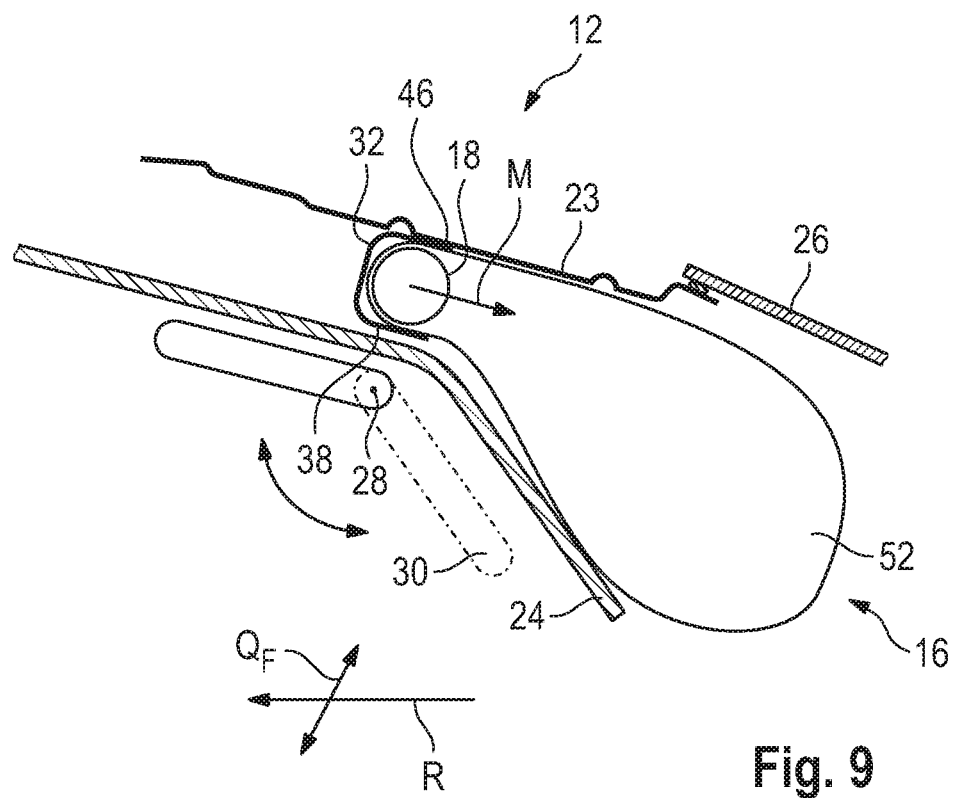

The initial deployment of the airbag 16 is illustrated in FIGS. 8 and 9.

FIGS. 10 to 17 show the deployment and the inflation of the airbag 16 in more detail. Although in FIGS. 11 to 17 the steering wheel is visible, this is only due to the lateral view chosen for representation. The airbag 16 deploys exclusively on the passenger side in this example and laterally beside the steering wheel.

Figure 10:
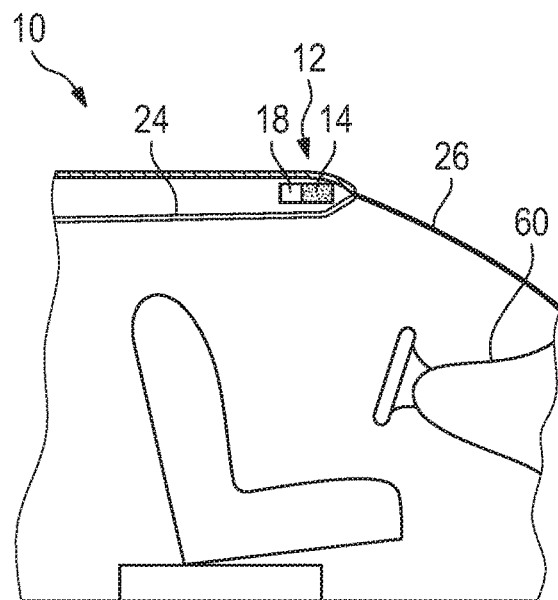
FIGS. 10 to 17 show the inflating operation of the airbag of the airbag module of FIG. 1 from the state prior to activation of the vehicle occupant restraint system to the completely inflated airbag in a schematic sectional view.
Figure 10:
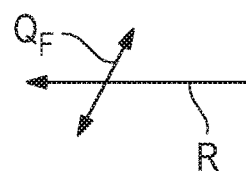

FIG. 10 shows the initial state prior to activation of the vehicle occupant restraint system 10.

The airbag package 14 initially lies folded beneath the closed roof liner 24. The airbag package 14 comprises two separately folded portions, viz. a main package 48 and a connecting portion 50 (indicated e.g. in FIGS. 1 and 3).

In the main package 48 a restraint part 52 of the airbag 16 is folded which in the deployed and inflated state covers the major part of the airbag volume and which substantially determines the restraining effect of the airbag 16. This is evident e.g. from FIGS. 17 and 19.

Figure 19:
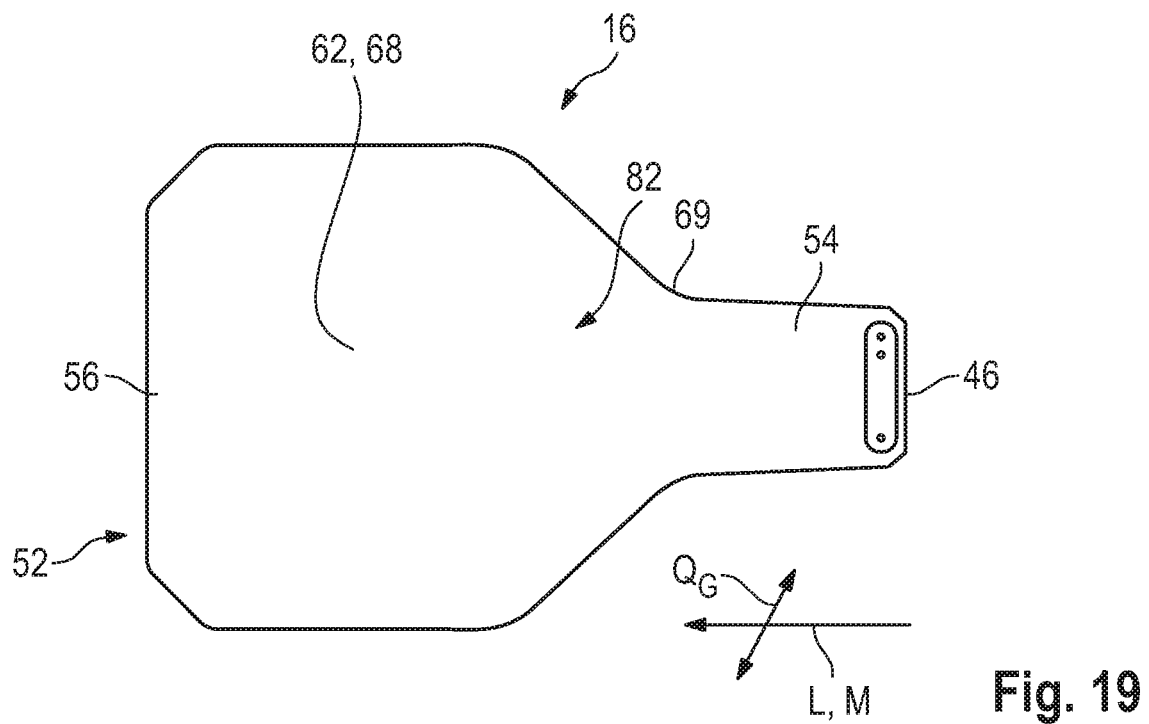
FIG. 19 shows the airbag of the vehicle occupant restraint system of FIG. 1 when being flatly spread in the non-inflated state in a top view onto a third outer wall portion of the airbag.
Figure 20:
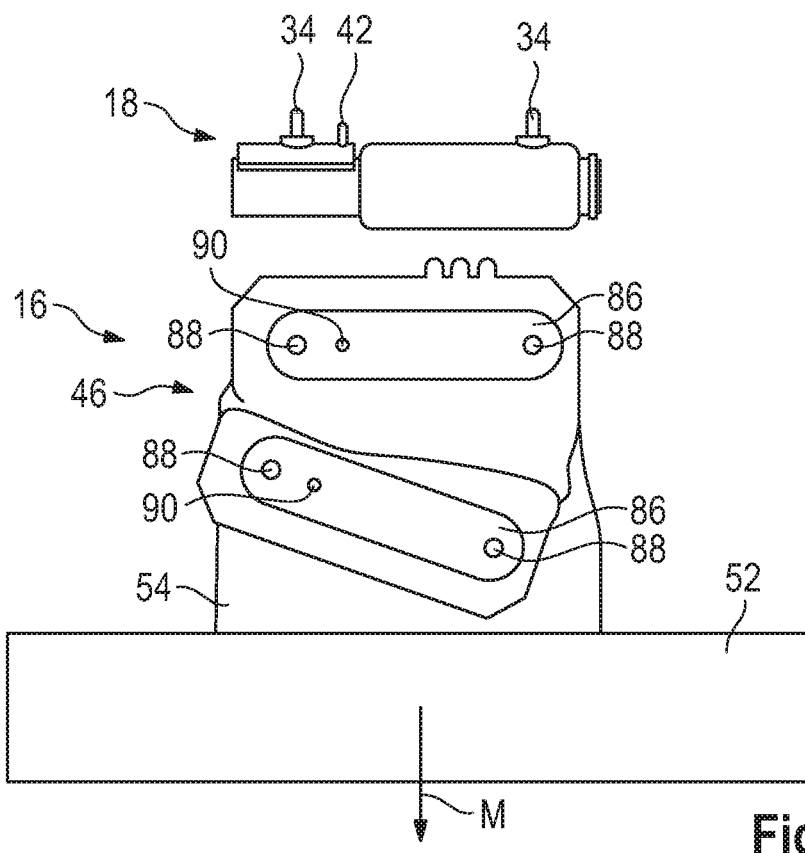
FIGS. 20 to 23 show a schematic representation of the insertion of an inflator into an inflation end of the airbag of the vehicle occupant restraint system of FIG. 1.
Figure 21:
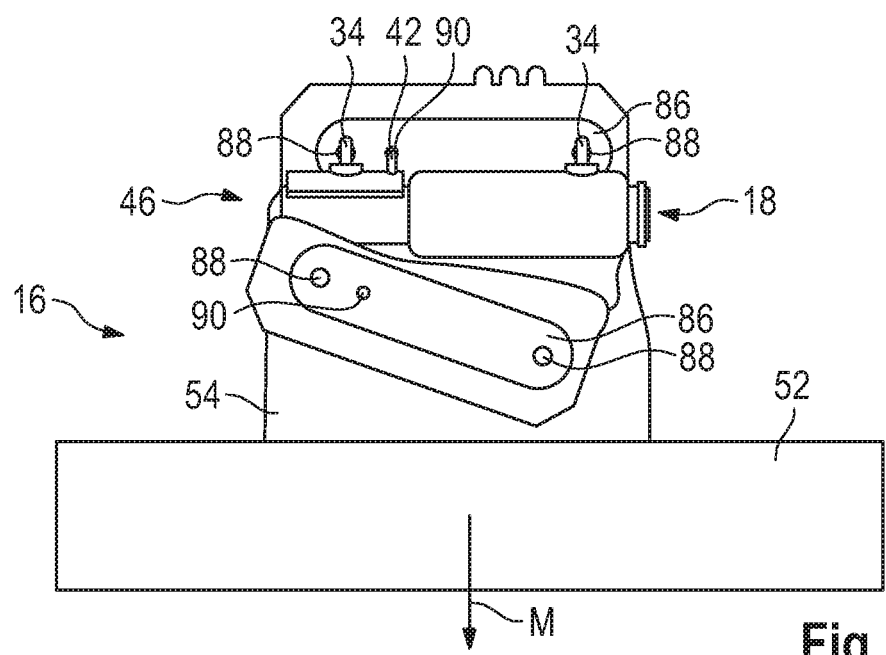

In the connecting portion 50 a neck 54 of the airbag 16 formed between the inflation end 46 and the restraint part 52 is folded (cf. also FIG. 19). In this example, the length of the neck 54 is approx. 5 to 40 cm, wherein those skilled in the art may easily adapt the exact length to the circumstances within the vehicle, e.g. the length of the passage and the position of the baffle of the airbag 16 in the inflated state.

In the transverse direction $Q_G$ of the airbag 16 normal to the longitudinal direction L thereof (cf. e.g. FIG. 19) and, resp., to the longitudinal module direction M, the neck 54 is definitely narrower than the restraint part 52. For example, the width of the neck 54 amounts to about 25-50% of the maximum width of the flatly spread restraint part 52. Thus, the filling volume of the neck 54 is definitely smaller than that of the restraint part 52.

The neck 54 in this embodiment does not contribute to the restraining effect as it acts high above in the vehicle directly on the roof liner. By decreasing the volume of the neck 54 by reducing its width, thus material, filling gas and space can be saved in the airbag module 12.

Figure 36:
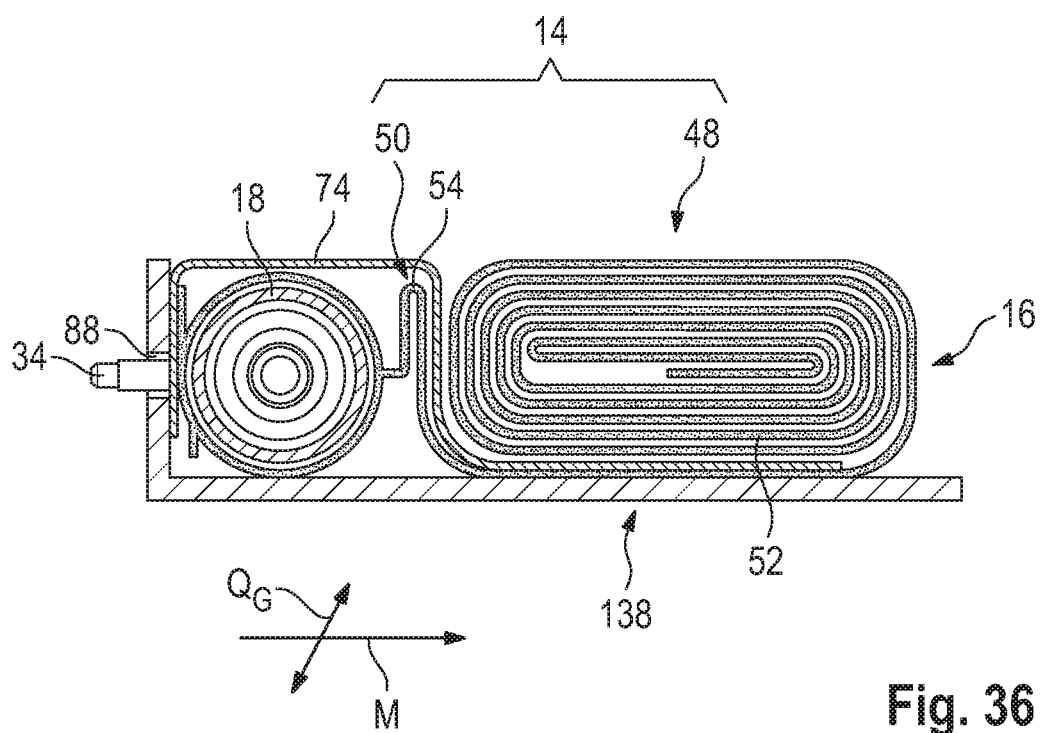
FIG. 36 shows the airbag package in a schematic sectional view being inserted in a folding device.

The connecting portion 50 and the main package 48 constitute two portions of the airbag package 14 folded separately from each other, as is evident from FIG. 36, for example.

Whereas the main package 48 is folded and rolled, for example, as will be illustrated later, the connecting portion 50 in this case is merely folded in zigzag having one to three folds in this example. The folds are strung in series in the longitudinal module direction M in this case.

In the longitudinal module direction M, the inflator 18, the connecting portion 50 and the main package 48 are located linearly in series.

This arrangement causes filling gas to flow from the inflator 18 initially into the neck 54 folded in the connecting portion 50. Due to the mere zigzag folding, the folds are filling one by one, which results in the fact that the connecting portion 50 will stretch and thus will exert a force acting in the longitudinal module direction M on the still folded main package 48.

Figure 11:
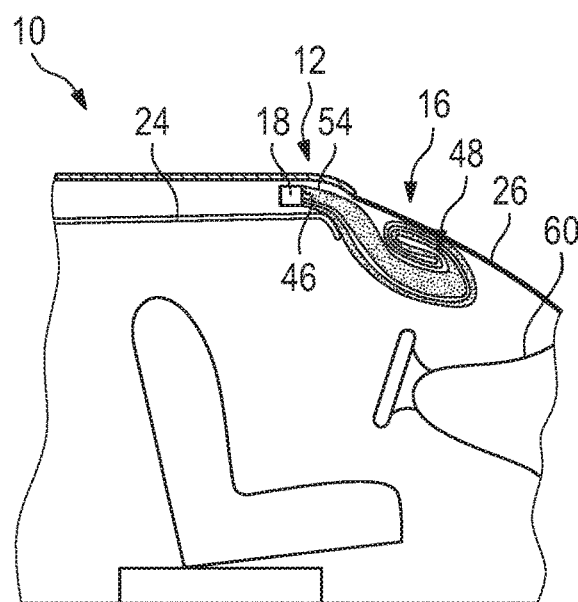
Figure 11:
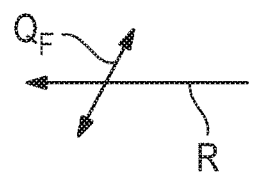
Figure 12:
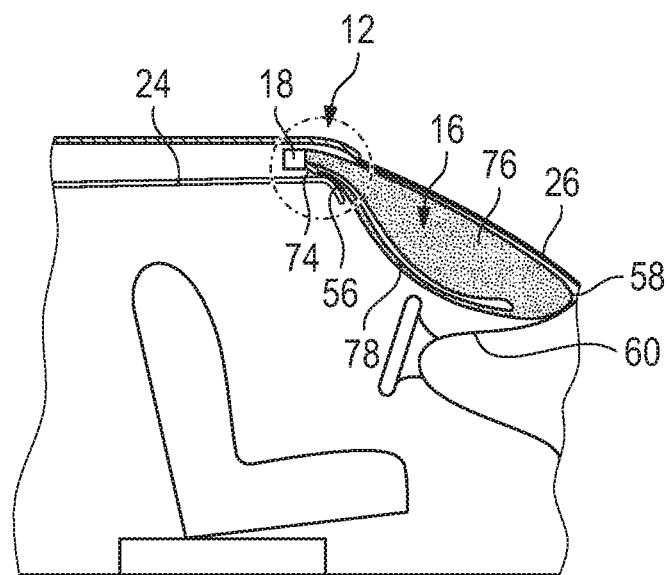
Figure 12:
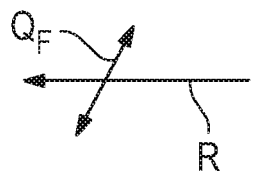
Figure 13:
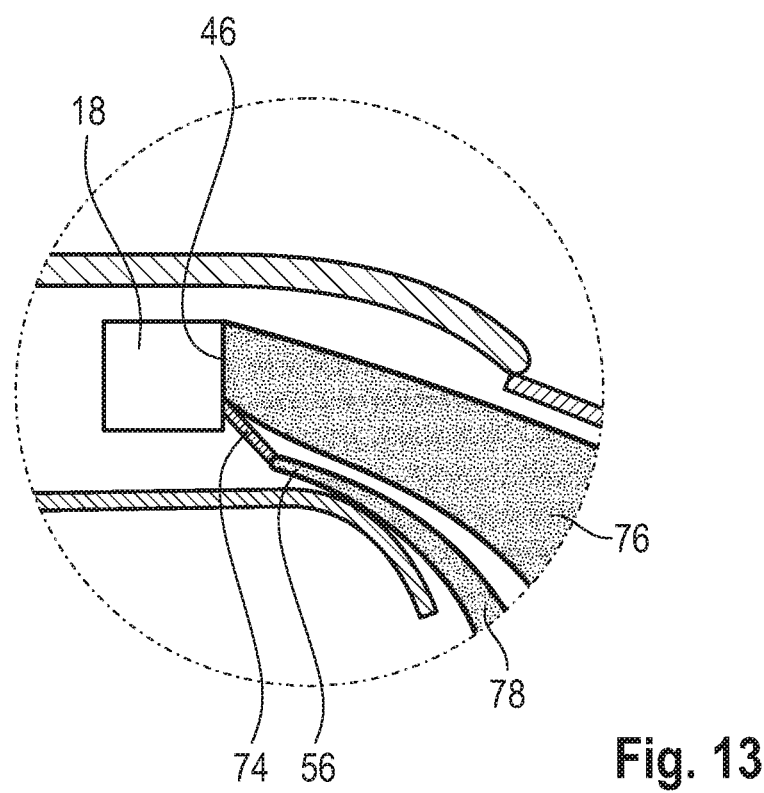

As a result, the main package 48 presses the roof liner 24 open and is pushed into the vehicle interior while still being substantially folded. This situation is schematically shown in FIG. 11.

At this point in time, substantially no gas flows into the main package 48, as the gas flow is blocked by the still existing folds of the connecting portion 50.

Although here this folding technique and the sliding of the main package 48 into the vehicle interior is described in connection with an airbag module 12 fastened to the roof, according to the invention this technique may be conferred upon airbag modules that are used at other locations within the vehicle, such as in the knee area or in a backrest.

In the side view, the completely inflated airbag 16 approximately takes a Y-shape or T-shape (see FIG. 17), with the stem of the Y or T being formed by the inflation end 46 and the neck 54. The restraint part 52 comprises a first free end 56 as well as a second free end 58. This is evident for the inflated airbag 16 in FIG. 17 and for the non-inflated flatly spread airbag 16 e.g. in FIG. 18 which illustrates the non-inflated airbag 16 in a lateral sectional view, wherein the usually flatly superimposed layers are shown to be somewhat pulled apart for reasons of clarity.

In the fully inflated state, the second free end 58 is located in a transition between the windshield 26 and an instrument panel 60 of the vehicle, while the first free end 56 extends in the direction of the vehicle occupant and forms a lower end of the total airbag 16 as well as of a baffle 62 for absorbing the vehicle occupant.

Figure 18:
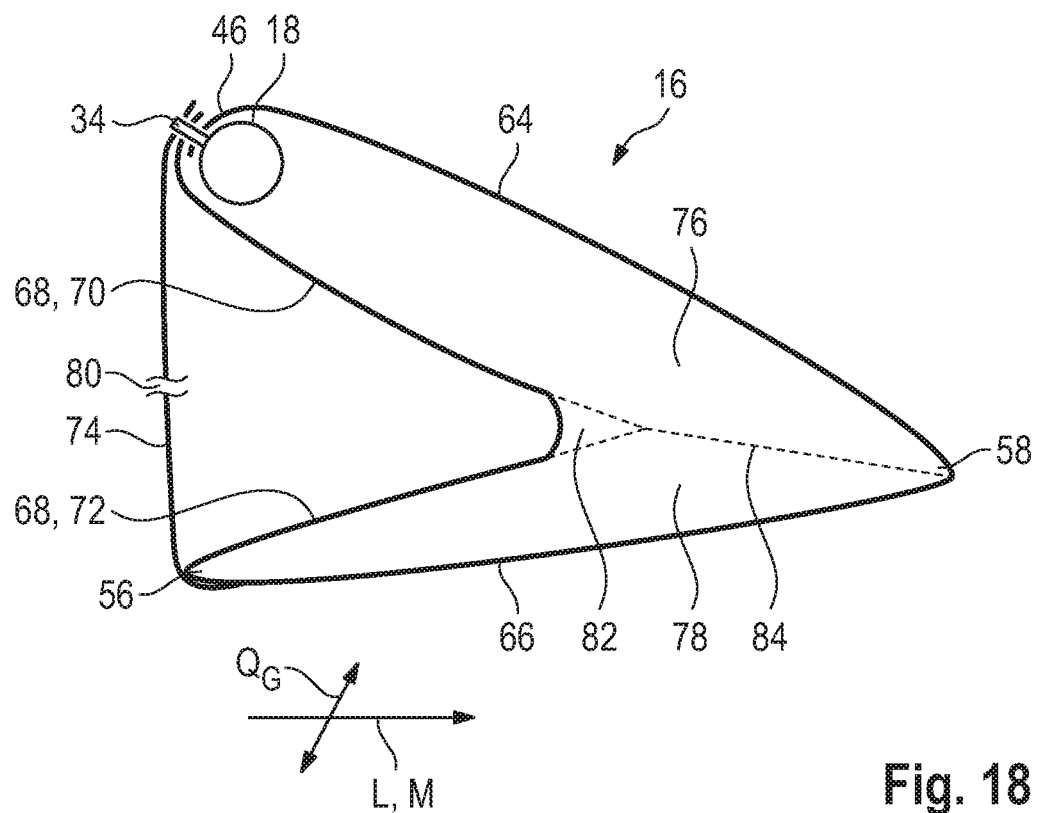
FIG. 18 shows a schematic sectional view of the airbag of the vehicle occupant restraint system of FIG. 1 with the inflator being inserted.

The airbag 16 substantially includes three large outer wall portions 64, 66, 68 (see FIG. 18). A first outer wall portion 64 extends from the inflation end 46 to the second free end 58 and in the inflated state forms a bearing surface for the airbag 16 on the windshield 26. A second outer wall portion 66 extends from the second free end 58 to the first free end 56 and in the inflated state is located above the instrument panel 60. A third outer wall portion 68 extends from the first free end 56 to the inflation end 46 and in the inflated state of the airbag 16 forms the baffle 62 for the vehicle occupant.

In the third outer wall portion 68 the neck 54 is transformed into the restraint part 52 via a shoulder 69 which is beveled on both sides so that a continuous transition is formed from the neck 54 into the baffle 62 (cf. FIG. 19).

In the folded main package 48, however, the first free end 56 is folded back toward the inflation end 46 so that portions 70, 72 of the third outer wall portion 68 are folded back onto themselves. Accordingly, initially the free end 56 is connected to the inflation end 46 by a tether 74. This is shown in detail in FIGS. 12, 13 and 18.

The tether 74 in this example is not fixed directly to the first free end 56 but offset by about 5 to 20 cm on the second outer wall portion 66. This permits a more compact folding of the airbag package 14, as will be described below.

This fact as well as the folding of the main package 48 described later in detail ensure that at the time when the main package 48 arrives in the vehicle interior the first free end 56 is still withheld by the tether 74 in the roof area. The remainder of the main package 48 meanwhile further deploys in the vehicle interior, wherein the filling gas flowing into the airbag 16 at first inflates only a partial area of the airbag 16.

Figure 14:
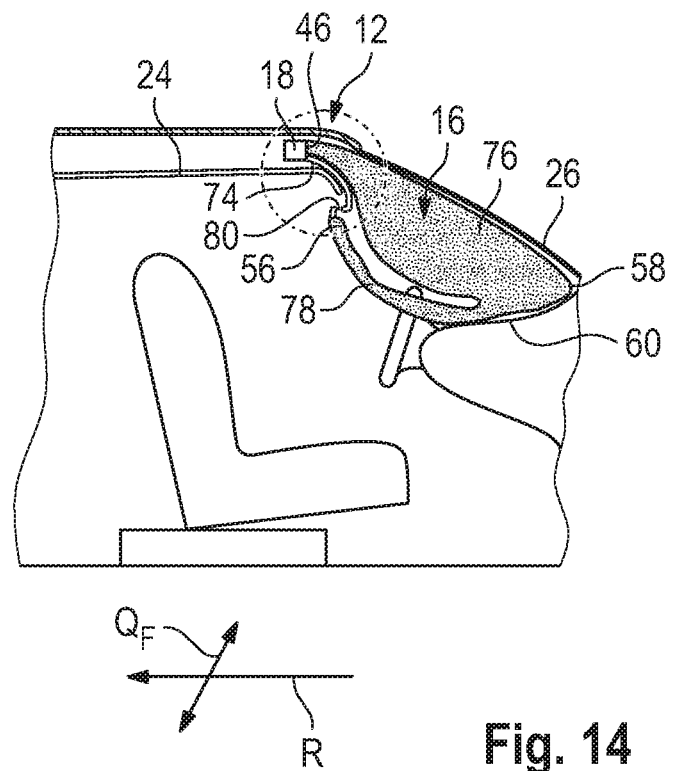
Figure 15:
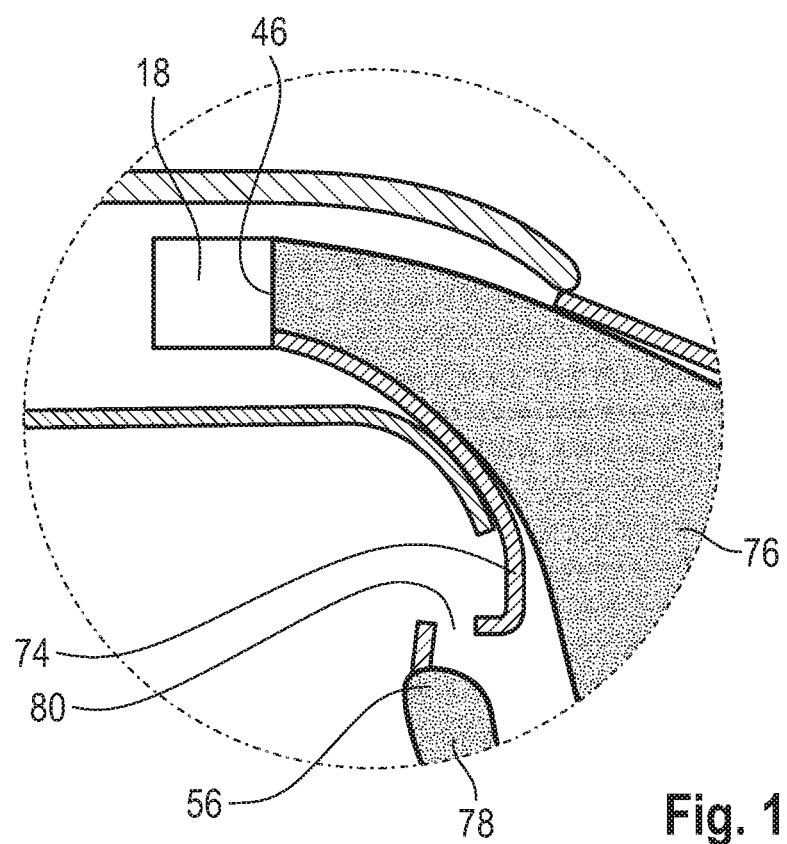

It is evident from FIGS. 14 and 18 that at this time when the first free end 56 is still connected to the inflation end 46 via the tether 74, the airbag 16 takes approximately a U-shape having an inner leg 76 and an outer leg 78.

The inner leg 76 of the U is delimited toward the windshield 26 by the first outer wall portion 64 of the airbag 16. Toward the passenger compartment, the inner leg 76 is delimited by an upper portion 70 of the third outer wall portion 68.

The outer leg 78 is delimited toward the instrument panel 60 by the second outer wall portion 66. Toward the vehicle interior, the outer leg 78 is delimited by a lower portion 72 of the third outer wall portion 68.

The two portions 70, 72 of the third outer wall portion 68 are initially held together by the tether 74. In this way, filling gas flows only into the inner leg 76, while the outer leg 78 still remains substantially unfilled, although the airbag package 14 already has largely deployed. This situation is illustrated in FIGS. 12 to 15.

When a particular tensile force which is accompanied by a predetermined filling volume of the airbag 16 is exceeded, the tether 74 becomes detached after a first period of time following activation of the inflator 18. In this example, for this purpose a weakened zone 80 is formed on the surface of the tether 74 (see FIG. 18).

Figure 16:
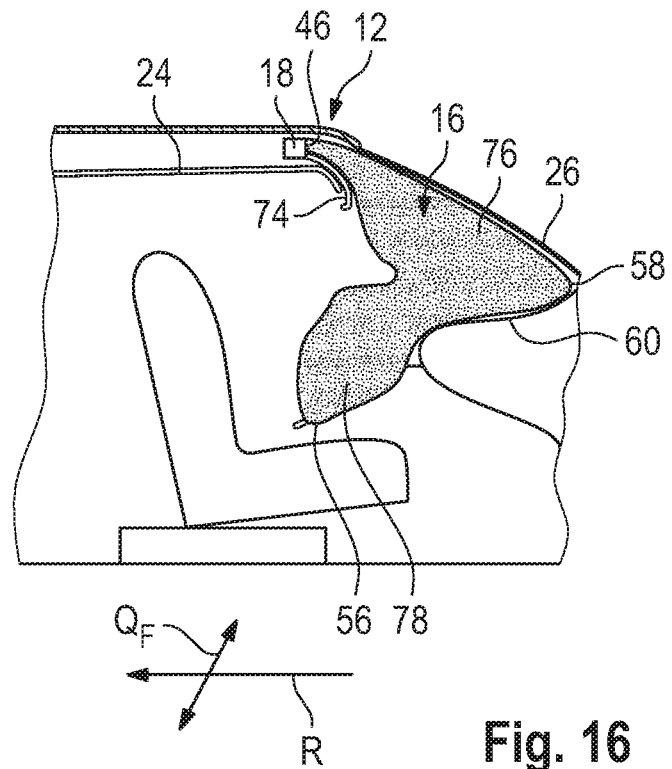

At the time when the tether 74 becomes detached, the neck 54 is already fully inflated in this example (see FIG. 16).

Figure 17:
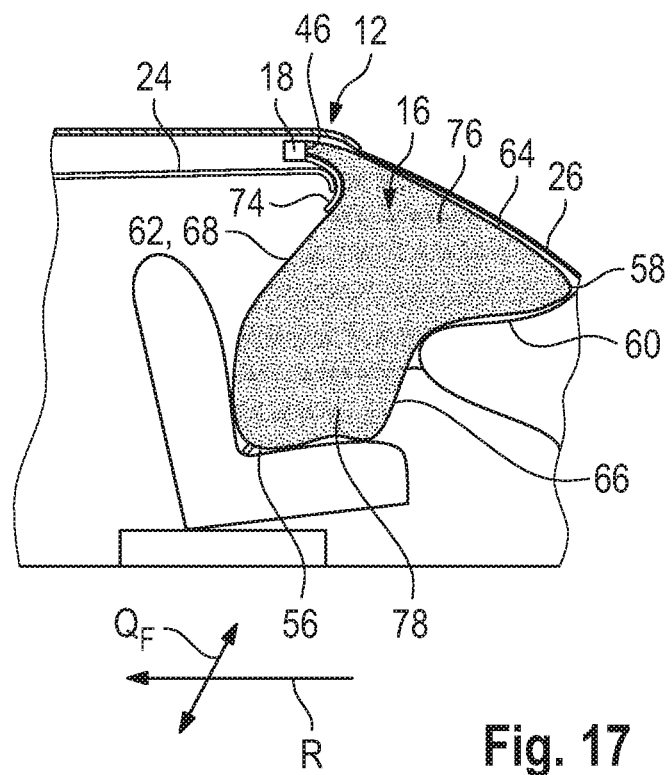

In a second period following the first period, the airbag 16 is completely filled after the tether 74 has split in two parts at the weakened zone 80. The completely inflated state is shown in FIG. 17.

In the fully inflated state, the airbag 16 takes approximately a Y-shape or a T-shape, when viewed from the side, as the inner leg 78 has folded downwards in the vehicle interior. The arms of the Y then are formed by two inflated portions of the restraint part 52 each of which extend from the first and second free ends 56, 58 toward the inflation end 46 and both of which merge into the neck 54.

Moreover, in the third outer wall portion 68 a bag 82 inwardly reversed in the folded state (see FIG. 18) is formed which in the fully inflated airbag 16 bulges partly outwardly and thus enlarges the baffle 62. A lower end of the bag 82 is permanently connected to the second free end 58 via an inner tether 84, however, so as to stabilize the shape of the inflated airbag 16.

Preferably, before the airbag 16 is folded, the inflator 18 is fixed at the inflation end 46 in the airbag 16, as is shown in FIGS. 20 to 23. This step might also be taken after folding the airbag 16, however.

At the inflation end 46 the airbag 16 ends in two opposite tabs 86 each of which extends over the entire width of the neck 54. Each of the tabs 86 includes two fastening holes 88 as well as a positioning hole 90 corresponding, as to their arrangement, to the fastening bolts 34 and the positioning bolt 42 at the inflator 18 (see e.g. FIG. 20).

Inside the airbag 16 each of the two tabs 86 may be reinforced by one or more reinforcing layers which also may include a temperature-resistant and gastight coating, where necessary.

Figure 22:
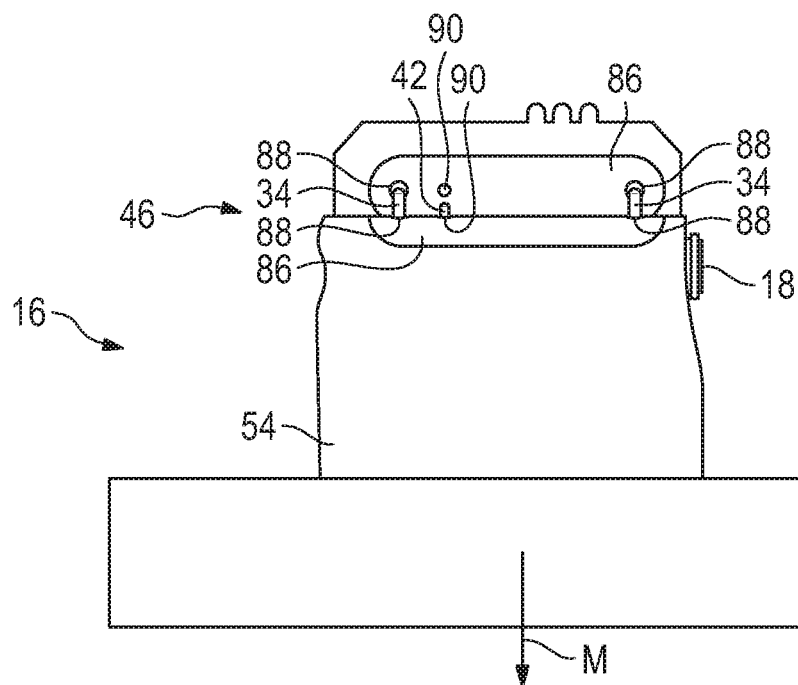
Figure 23:
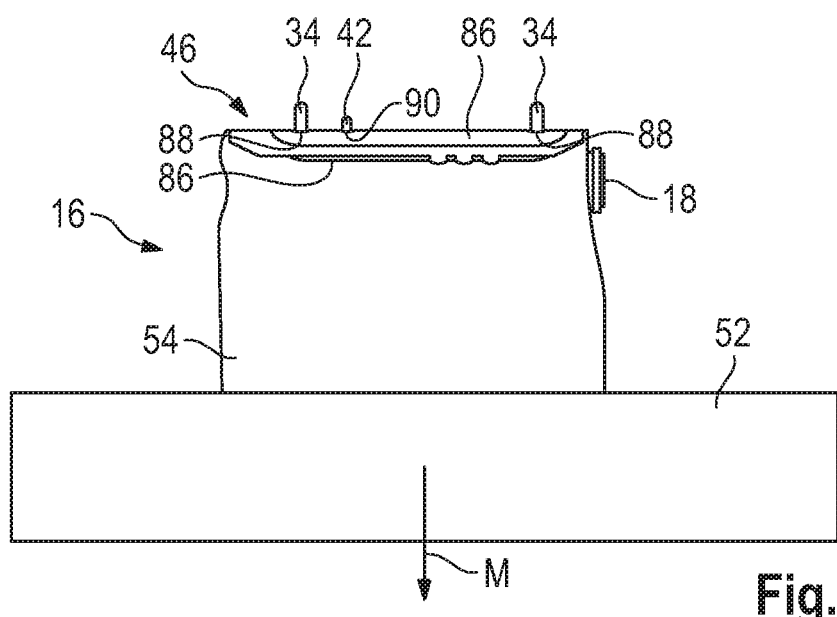

For assembly of the inflator 18, the latter is placed between the two tabs 86 (FIG. 21) and then the two tabs 86 are individually folded over the inflator 18, with each fastening hole 88 being pulled over the fastening bolts 34 and the positioning hole 90 being pulled over the positioning bolt 42 (FIGS. 22 and 23).

Due to the wrapping by the two tabs 86 and possibly the coating provided on the inside of the tabs 86, the inflator-side inflation end 46 of the airbag 16 now is sufficiently sealed in a gastight manner.

The tabs 86 now are secured to the fastening bolts 34 by means of clamping washers and/or screw nuts (not shown).

Figure 24:
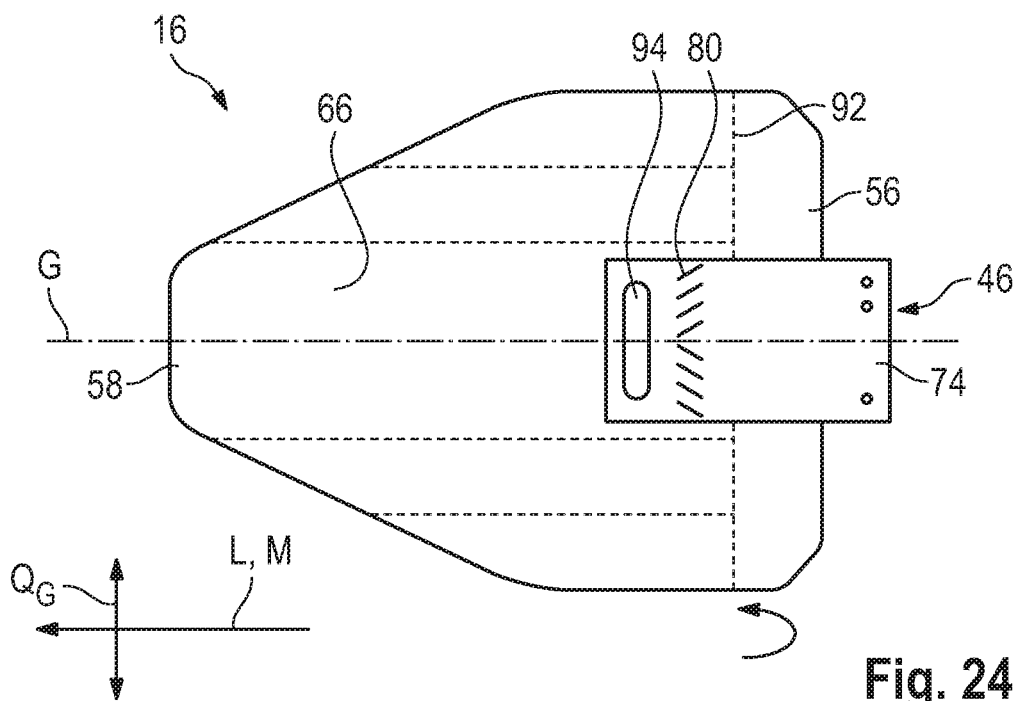
FIGS. 24 to 27 show steps of folding the airbag of the vehicle occupant restraint system of FIG. 1 when viewed in a top view.

For folding the airbag 16 into the airbag package 14, the airbag 16 at first is flatly spread as shown in FIG. 24, with the first end 56 being folded back to the inflation end 46.

Thus, in the area of the first free end 56 the two legs 76, 78 of the airbag 16 are superimposed. The third outer wall portion 68 is folded back onto itself in the portions 70, 72.

Each of the first outer wall portion 64 and the second outer wall portion 66, on the other hand, extends stretched from the second free end 58 to the inflation end 46.

The tether 74 is positioned so that its free end is located on the inflation end 46.

Figure 25:
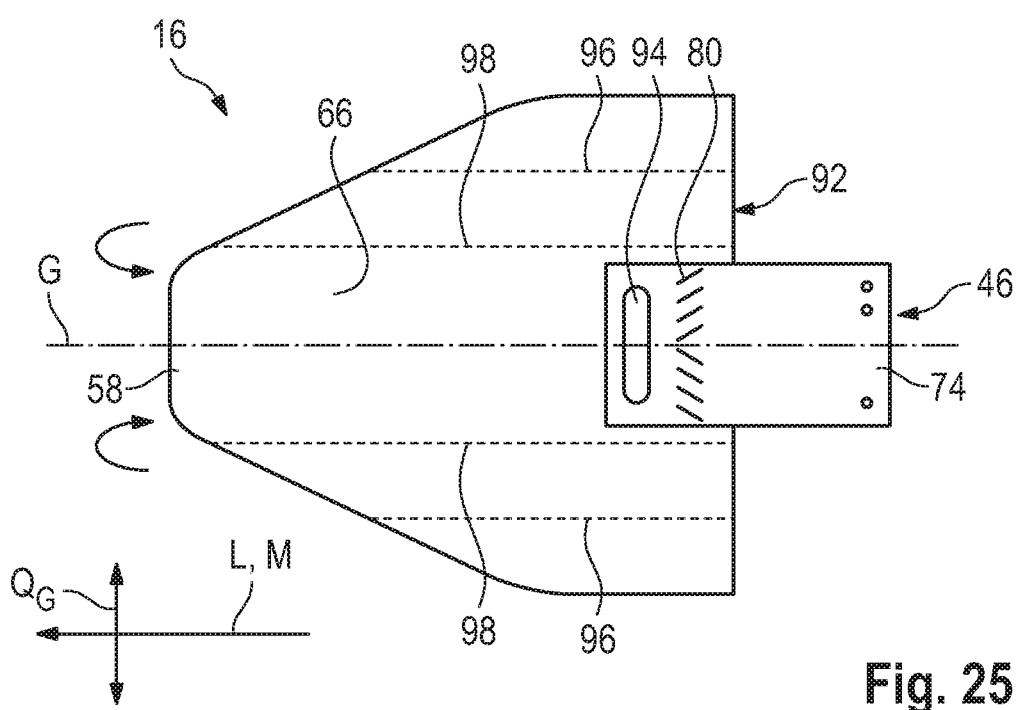

In a first folding step, the first free end 56 now is folded once about a folding line 92 located perpendicularly to the longitudinal airbag direction L (which in the flatly spread airbag 16 coincides with the longitudinal module direction M) but not over an attachment point 94 of the tether 74 on the second outer wall portion 66 (see FIGS. 24 and 25). Depending on the shape of the airbag, this folding step might be omitted as well.

Figure 26:
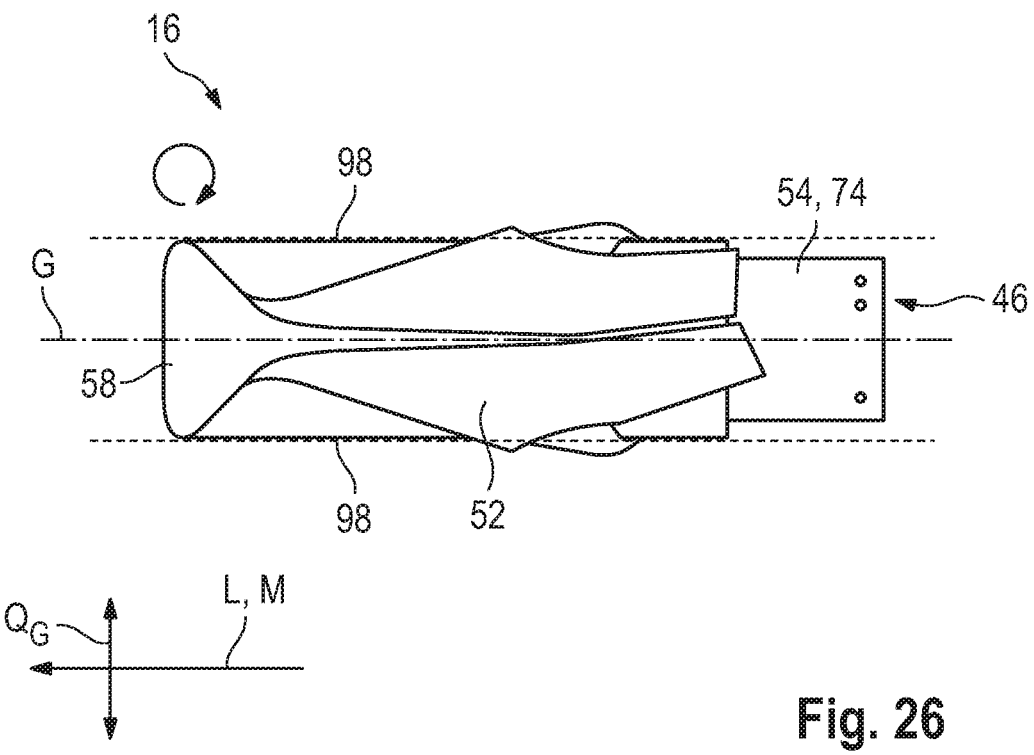

Now in a second folding step, the two lateral areas of the airbag 16 are folded inwardly in a zigzag fold along folding lines 96, 98 extending in parallel to the longitudinal airbag direction L. This is shown in FIGS. 25 and 26. The two folding lines 98 now delimit the airbag 16 laterally outwardly in the transverse direction $Q_G$.

The distance of the folding lines 96, 98 from each other and from a peripheral edge of the airbag 16 is selected so that in the center of the airbag no overlapping of the lateral areas of the airbag 16 will occur, wherein the center of the airbag 16 is defined by an imaginary center line G extending from the inflation end 46 to the second free end 58 and being arranged symmetrically to the inflation end 46.

In the spread state, the airbag 16 can be symmetrical with respect to said center line G, however this is not imperative but is determined, inter alia, by the geometry of the passenger compartment, the windshield 26 and the instrument panel 60.

Figure 27:
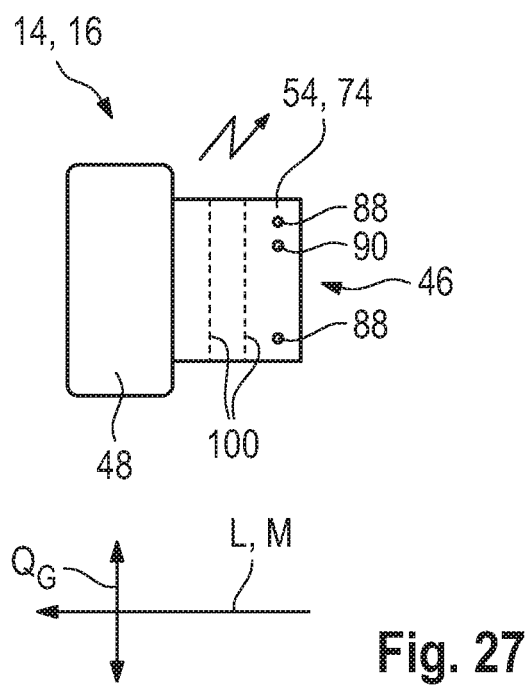

The partially folded airbag 16 shown in FIG. 26 now is rolled up in a rolling step starting from the second free end 58, for example in three to ten turns, especially in six turns, toward the inflation end 46. The result of this folding step is illustrated in FIG. 27. The rolled-up area now forms the main package 48. The airbag 16 is rolled up only to the end of the restraint part 52 of the airbag 16. The areas of the neck 54 and of the tether 74 projecting therefrom in the direction of the inflation end 46 (see FIGS. 26 and 27) remain unaffected by this folding step.

In another folding step, the area of the neck 54 as well as possibly of the tether 74 projecting from the main package 48 is folded into a mere zigzag folding having about one to three folds, with the folding lines 100 being aligned perpendicularly to the module direction M and thus in parallel to a longitudinal axis of the inflator 18 (not shown here). Now the folded airbag package 14 takes the shape shown in FIGS. 27 and 36.

The same hole structure 88, 90 as at the tabs 86 of the airbag 16 is realized also at the free end of the tether 74, and the tether 74, too, is pulled over the fastening bolts 34 and the positioning bolt 42 with the fastening holes 88 and the positioning hole 90 (see also FIG. 36). The two tabs 86 and the tether 74 now are superimposed in three layers, with the fastening bolts 34 of the inflator 18 passing through all three aligned fastening holes 88. This applies mutatis mutandis to positioning holes 90.

In the mounted state, the airbag 16 is connected to the module carrier 22 in a load-bearing manner via the fastening bolts 34. The tensile forces acting on the tether 74 are also transmitted to the module carrier 22 via the fastening bolts 34.

Figure 28:
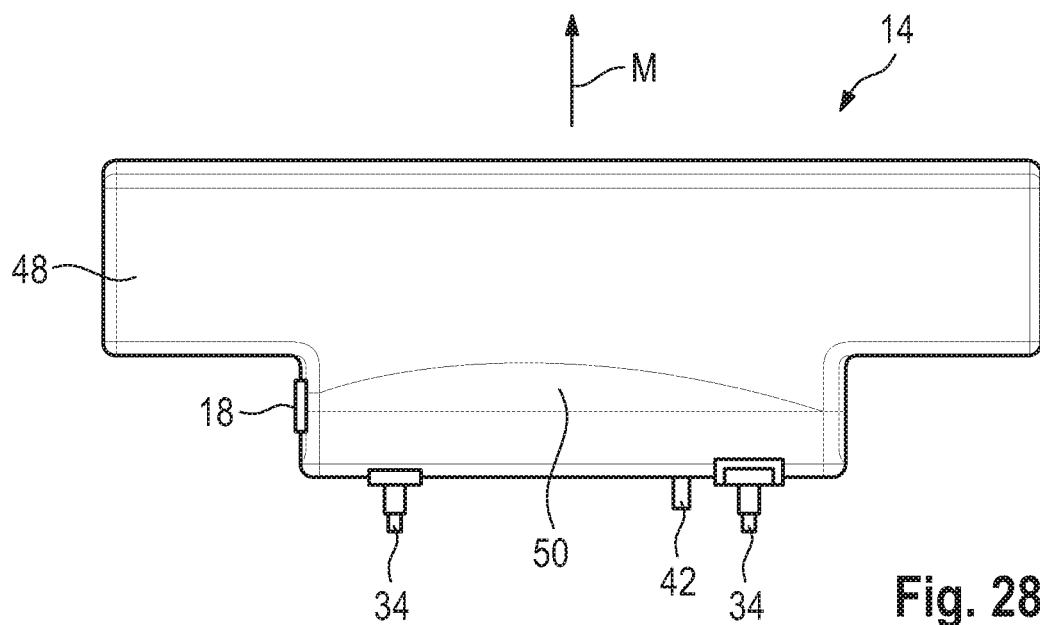
FIG. 28 shows a schematic representation of the folded airbag package of the vehicle occupant restraint system of FIG. 1.

After inserting the inflator 18 and folding the airbag 16, the airbag package 14 takes the shape as shown in FIG. 28.

After fixing the inflator 18 in the airbag 16 and folding the airbag 16 into the airbag package 14, the airbag package 14 is inserted along with the inflator 18 into the wrapping 20.

The FIGS. 29 to 35 illustrate the wrapping 20 in detail.

Figure 30:
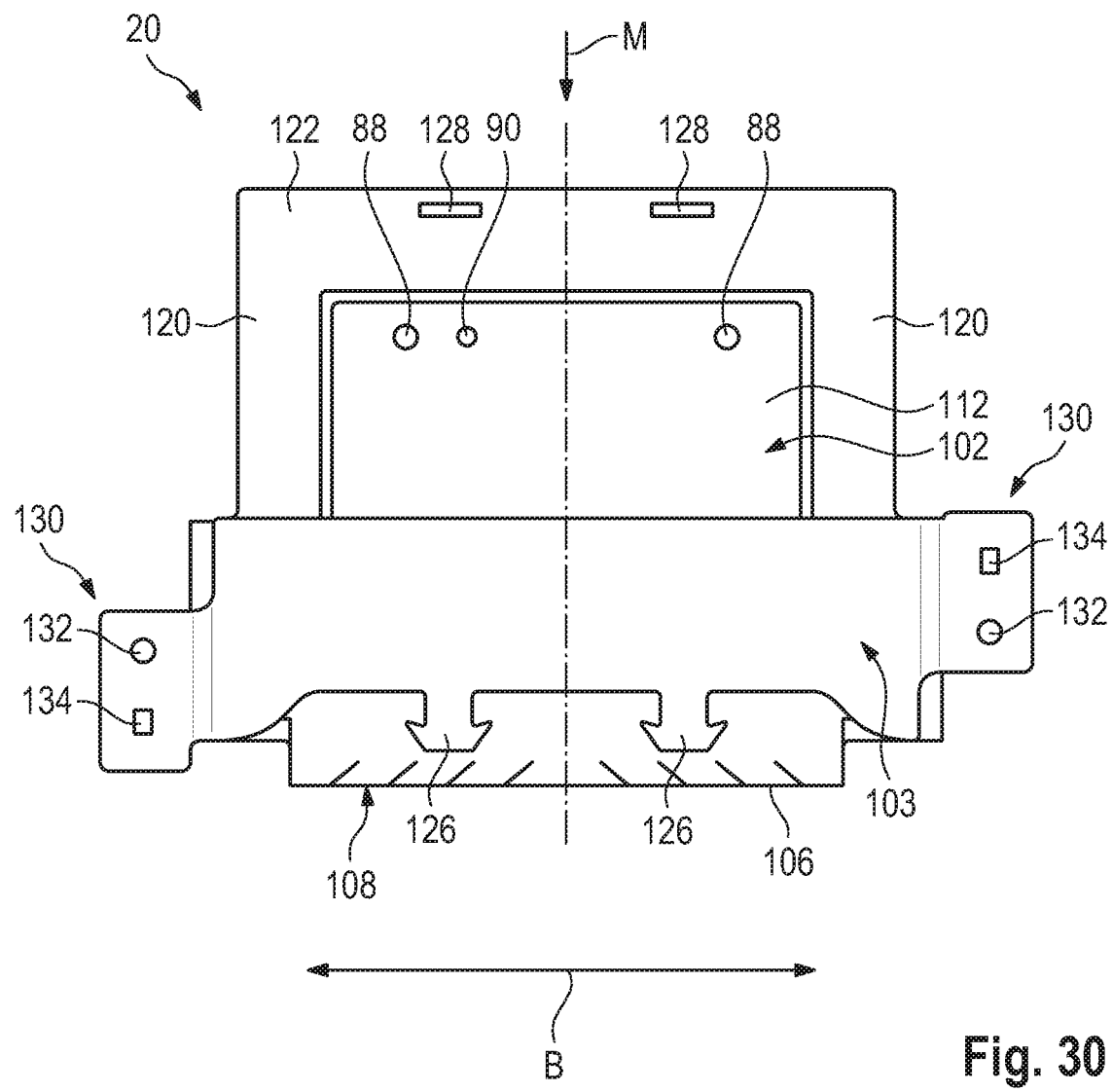
FIG. 30 shows a schematic top view onto the wrapping of FIG. 29.

In this example, the wrapping 20 consists completely (except for possible seams, of course) of airbag fabric and is composed of exactly two cut parts 102, 103 (see FIG. 30).

The wrapping 20 includes a holding bag 104 (see FIG. 31) that is formed by two folded portions of the first cut part 102 and serves for holding the main package 48 of the airbag package 14. A bottom 106 of the holding bag 104 is provided with a weakened zone 108 (see FIG. 30, for example) and extends in a direction B normal to the module direction M.

Each of the two edges 110 (cf. FIG. 31) of the holding bag 104 facing away from the bottom 106 in one piece and seamlessly merges into a retaining tab 112. The two retaining tabs 112 form an inflator fixation 114 for fixing the inflator 18 in the wrapping 20 and at each of their free ends include a hole pattern corresponding to the arrangement of the fastening bolts 34 and the positioning bolt 42. Accordingly, at the free edge of each retaining tab 112 two fastening holes 88 as well as one positioning hole 90 are provided.

The holding bag 104 and the retaining tabs 112 are jointly realized in the first cut part 102 by the first cut part 102 being folded back onto itself and the longitudinal edges adjacent to the folding line being connected in portions so as to form the holding bag 104. The free portions exceeding the holding bag 104 then form the retaining tabs 112 (cf. e.g. FIGS. 30 and 31).

Figure 31:
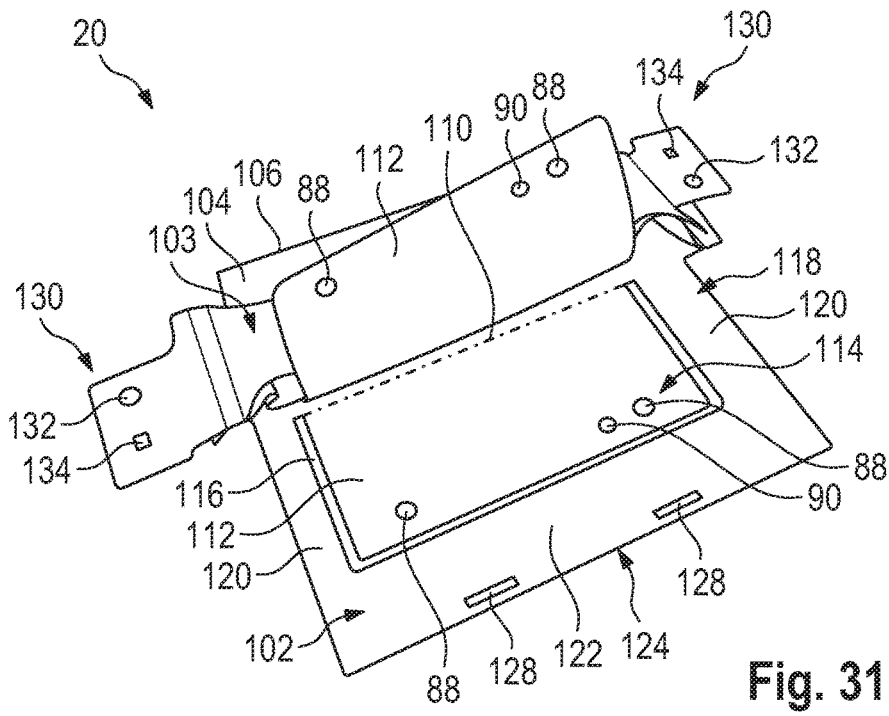
FIG. 31 shows a schematic perspective representation of the wrapping.

One of the retaining tabs 112, in FIG. 31 the flatly spread lower retaining tab 112, is disconnected by a U-shaped intersecting line 116 from a surrounding remainder of the first cut part 102. The intersecting line 116 forms a bracket 118 having two belt portions 120 located on the side of the retaining tab 112 as well as a web 122 connecting the two belt portions 120. The belt portions 120 merge into the holding bag 104 in one piece at their end opposite to the web 122.

The bracket 118 is part of an airbag package fixation 124. In addition, the latter includes at least one pair of first and second fixing elements 126, 128 adapted to be nested and thus to be fixed to each other. In this case, two pairs of fixing elements 126, 128 are provided which are juxtaposed in parallel to the direction B of the bottom 106. The exact position and number of fixing elements as well as the formation thereof are at a skilled person's discretion, of course.

In this example, the first fixing elements 126 are formed at the second cut part 103 extending in parallel to the direction of the bottom B over the holding bag 104. The first fixing elements 126 in this example take the shape of arrow-type hooks (cf. especially FIGS. 30 and 35) which are formed at an edge of the second cut part 103 facing the bottom 106.

Figure 35:
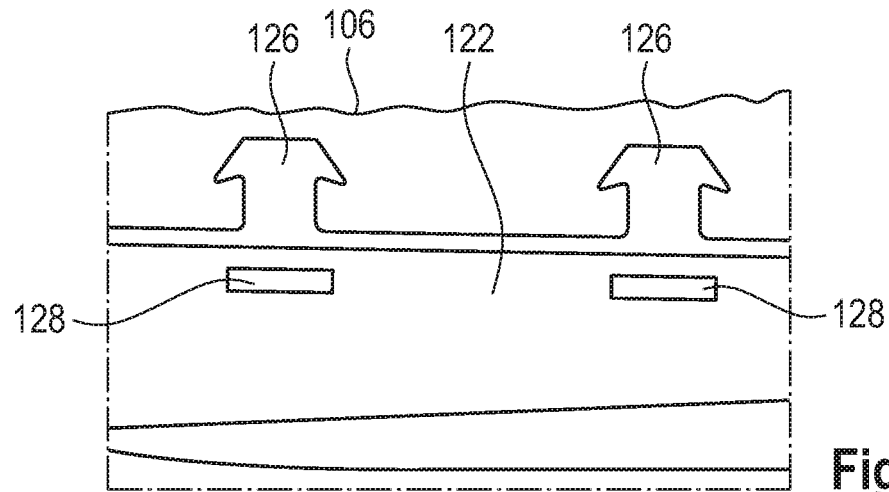
FIG. 35 shows details of the airbag package fixation of the wrapping.

Each of the two second fixing elements 128 is configured in the web 122 and here is formed by an elongate opening each through which the hook of the first fixing element 126 can be inserted so that the hook edges engage behind the edge of the opening and fix the first fixing element 126 to the web 122. FIG. 35 shows a detailed view of the fixing elements 126, 128.

The second cut part 103 in this embodiment is made from multi-layer airbag fabric, whereas the first cut part 102 is cut out of a single-layer airbag fabric. Cutting is performed by laser-cutting in this case, thus causing in the second cut part 103 the edges of the plural layers to be welded directly to each other without any further fixation of the edges to each other being required. Since, in this way, also the first fixing elements 126 are made from multi-layer airbag fabric, they have sufficient stiffness so as to get caught in the openings of the second fixing elements 128.

The second cut part 103 extends beyond the holding bag 104 laterally, viz. in parallel to the bottom direction B. At each of its free ends, a fixing portion 130 which serves for fastening the wrapping 20 tightly to the vehicle is formed. Said fastening need not bear the complete load of the deploying airbag 16, but primarily serves for positioning the airbag module 12 on the roof rail 23.

However, here the fixing portions 130 are also used for prefixing the airbag module 10 in the vehicle. For this purpose, each of the fixing portions 130 includes, apart from a fastening hole 132 through which e.g. a screw for vehicle-tight fastening is inserted, a further prefixing hole 134 in which a fastening clip 136 is inserted (see FIG. 34). When assembling the airbag module 10 to the vehicle, the fastening clip 136 is pushed into an opening on the roof rail 23 or on the module carrier 22 and maintains the airbag module 10 in position until the final fastening is completed.

The fastening hole 132 and the prefixing hole 134 are arranged in the two fixing portions 130 each in parallel to the longitudinal module direction M on top of each other but in a different order (see e.g. FIG. 30).

Figure 32:
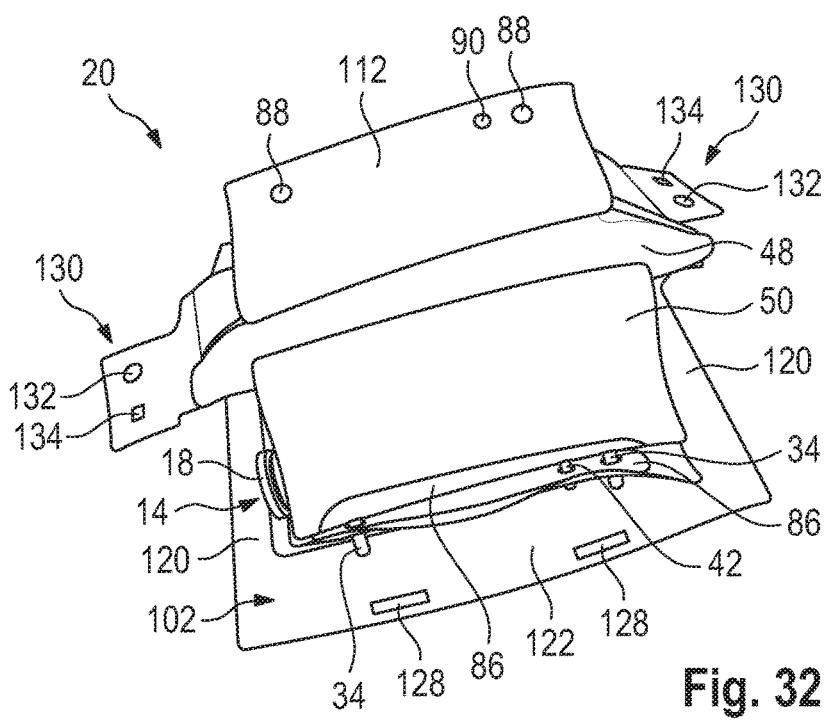
FIGS. 32 to 34 show the insertion of the airbag package into the wrapping.
Figure 33:
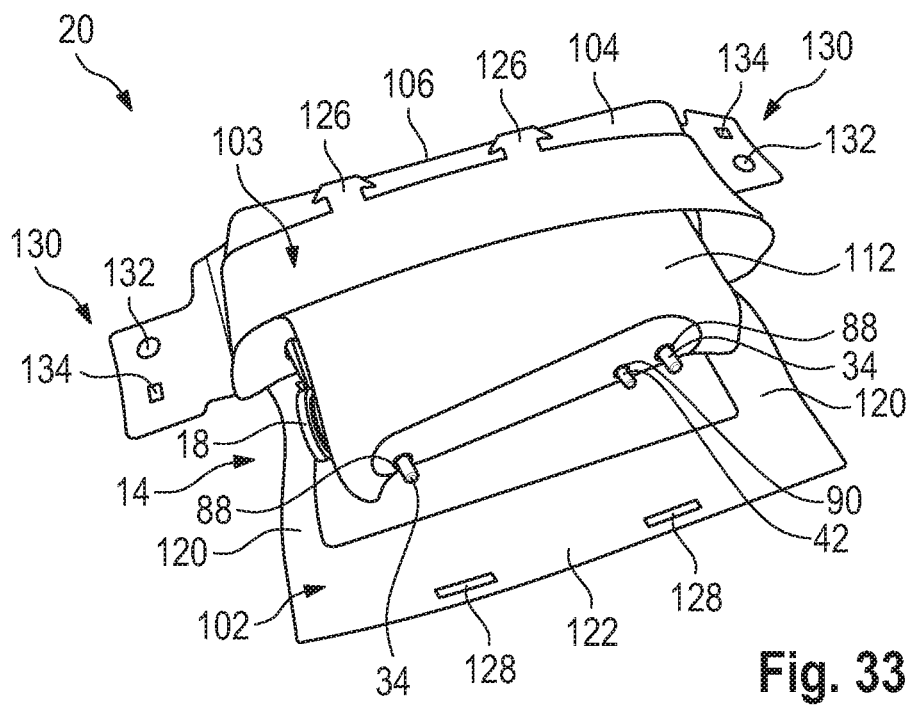
Figure 34:
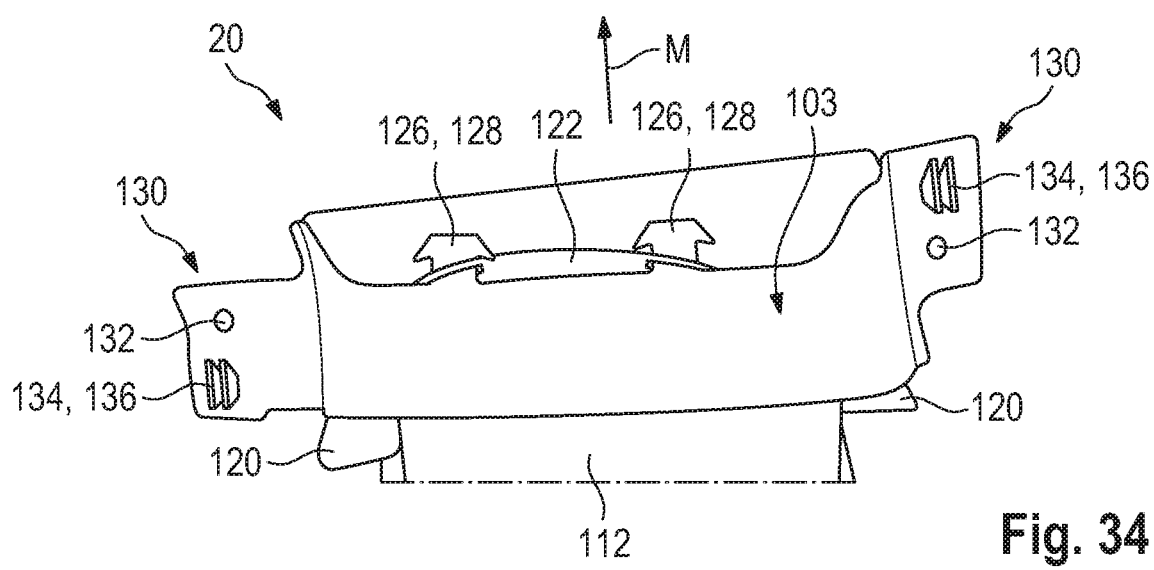

For inserting the airbag package 14 into the wrapping 20, initially the main package 48 is inserted into the holding bag 104 (see FIGS. 31 and 32). Then the two retaining tabs 112 are successively pulled with the fastening holes 88 and the positioning holes 90 over the fastening bolts 34 and the positioning bolt 42 of the inflator 18 so that they encompass the inflator 18 as well as naturally the inflation end 46 of the airbag 16 on the rear side of the inflator 18 (cf. FIGS. 32 and 33 as well as 37 and 38).

Figure 37:
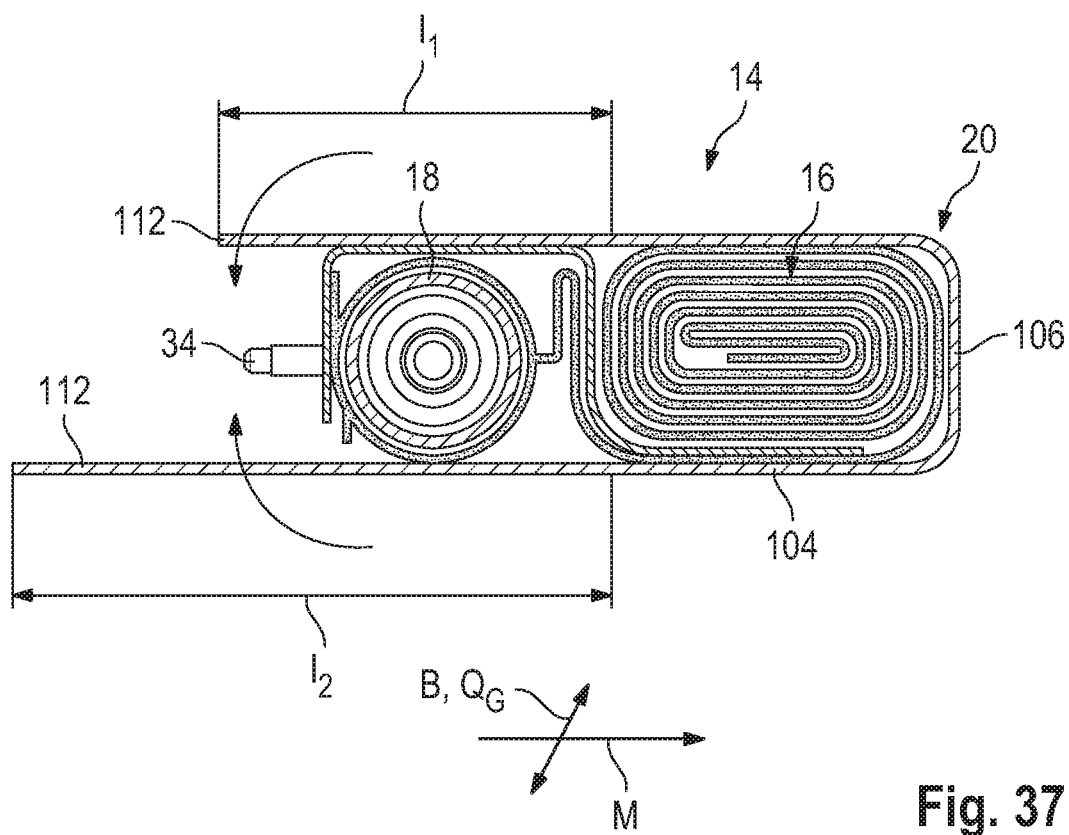
FIGS. 37 and 38 show the closing of an inflator fixation of the wrapping.
Figure 38:
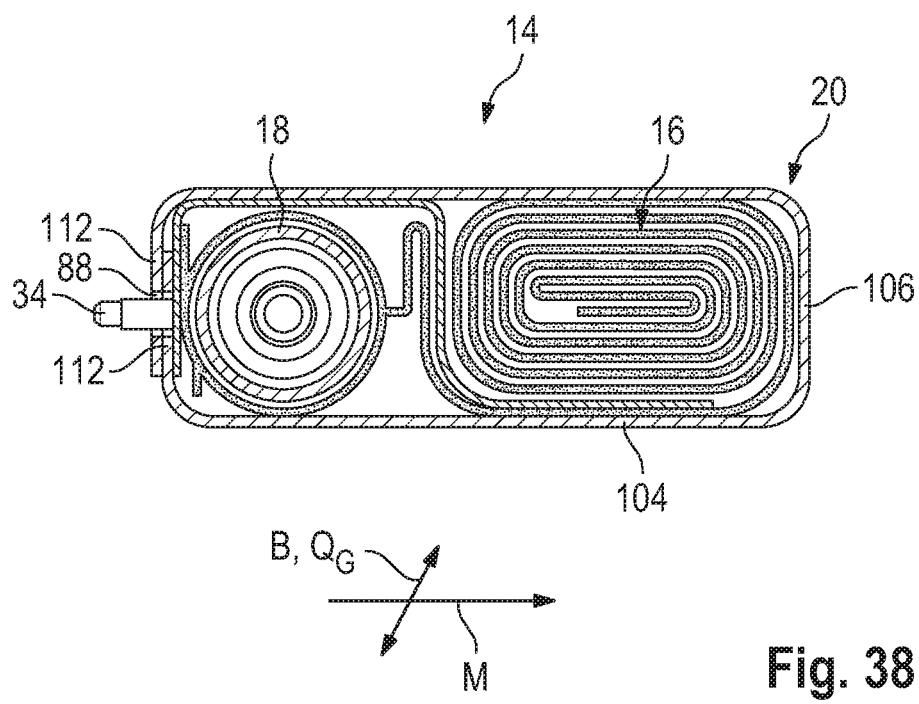

In the longitudinal module direction M, the two retaining tabs 112 may have different lengths Ii, 12 as shown in FIG. 37, for example. In this way, the tensile forces acting via the retaining tabs 112 upon the fastening bolts 34 of the inflator 18 can be adjusted to a certain degree. As a result, the alignment of the inflator 18 with respect to rotation about the longitudinal axis thereof can be determined by selecting the length of the retaining tabs 112. Usually the fastening bolts 34 are desired to extend exactly in the longitudinal module direction M. However, it might also be advantageous, for example for facilitating the assembly on the roof rail, when the bolts 34 are tilted by few degrees vis-à-vis the longitudinal module direction M. Since the inflator 18 usually includes a flat gas outlet area (not shown), tilting by few degrees will not affect the gas outflow and the inflation behavior of the airbag 16.

Since the inflator fixation 114 is closed as described (shown in FIG. 33), now the bracket 118 is pulled over the retaining tabs 112. In the next step, the web 122 is slid through below the second cut part 103 and the hooks of the first fixing elements 126 are inserted through the openings of the second fixing elements 128 (see FIG. 34). The belt portions 120 are now located on the side of the retaining tabs 122 above the main package 48 of the airbag package 14 and safely retain the latter within the holding bag 104. Thus, the airbag package fixation 124 is closed.

The airbag package 14 including the wrapping 20 now can be inserted in the module carrier 22 so as to assemble the airbag module 10 to the vehicle.

When activating the airbag module 10, the weakened zone 108 opens at the bottom 106 of the holding bag 104 so as to let the airbag package 14 move out. The inflator fixation 114, the airbag package fixation 124 as well as the vehicle-tight fixation via the fixing portions 130 remain closed.

In order to better fix the zigzag folding of the neck 54 in the connecting portion 50 while the airbag package 14 is inserted into the wrapping 20, in an alternative process an intermediate cover 140 may be used, as illustrated in FIGS. 39 to 44.

Figure 39:
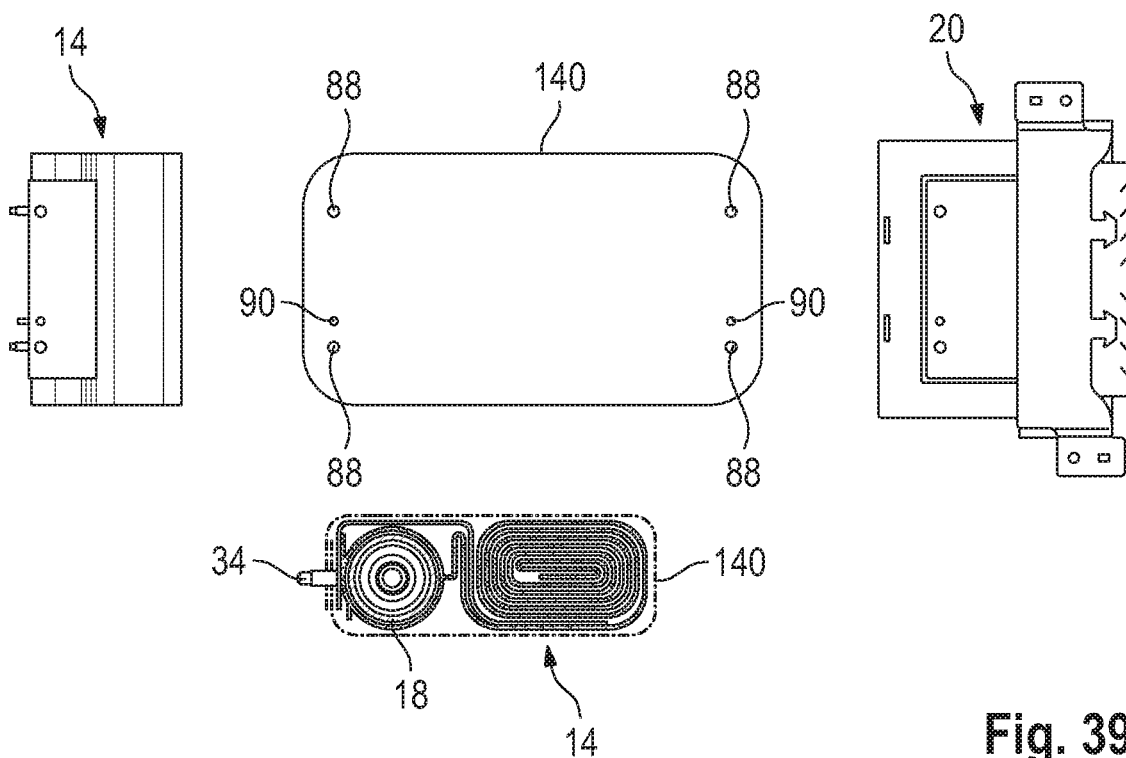
FIG. 39 shows a schematic overview of an alternative process for inserting the airbag package into the wrapping.

The intermediate cover 140 is a substantially rectangular piece of airbag fabric which at both free ends includes a hole pattern corresponding to the fastening bolts 34 and the positioning bolt 42 of the inflator 18 and having two fastening holes 88 and one positioning hole 90 (cf. FIG. 39).

Figure 40:
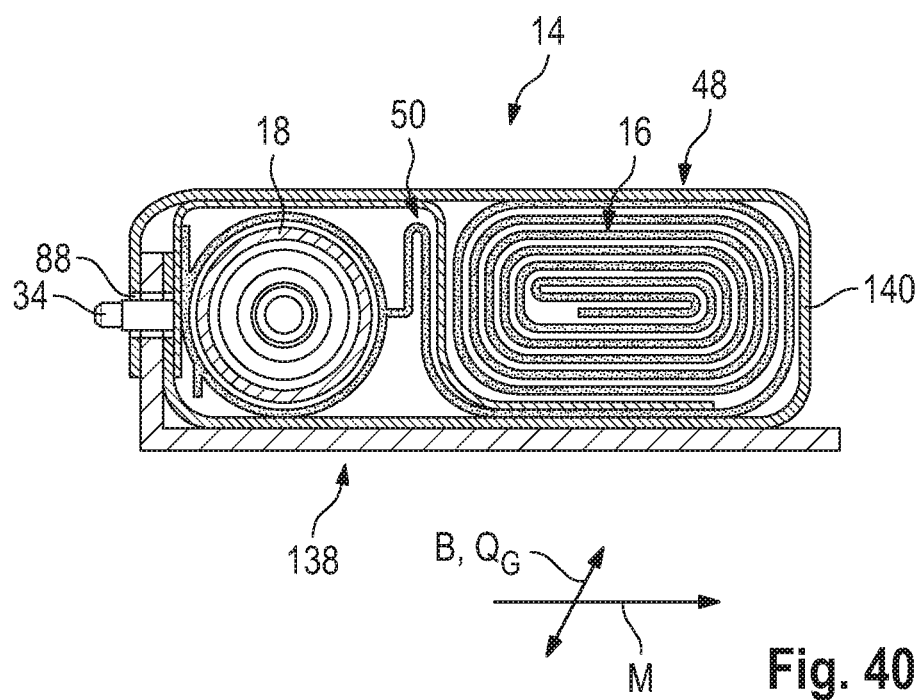
FIGS. 40 to 44 show steps of the alternative process for inserting the airbag package into the wrapping in a schematic representation.

The completely folded airbag package 14 including the inflator 18 is first wrapped into the intermediate cover 140, with both ends of the intermediate cover 140 being pulled over the bolts 34, 42 of the inflator 18. This is shown in FIG. 40, wherein use has been made of a known folding device 136.

Figure 41:
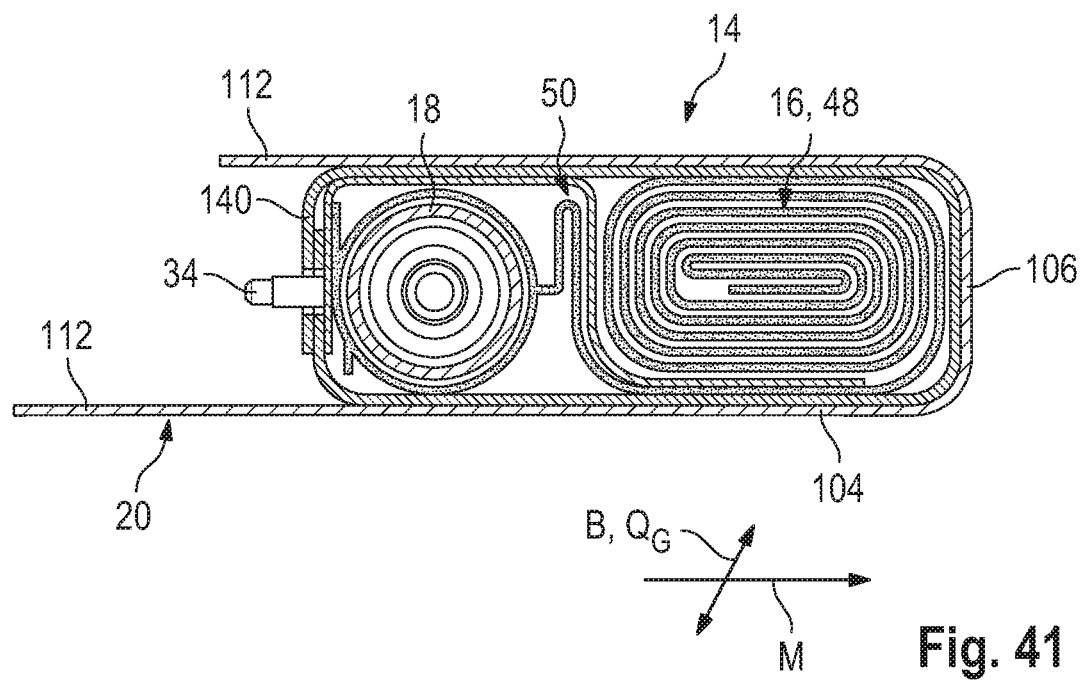

The airbag package 14 tightly enclosed by the intermediate cover 140 now is inserted into the wrapping 20, with the main package 48 being slid into the holding bag 104 (see FIG. 41).

Figure 42:
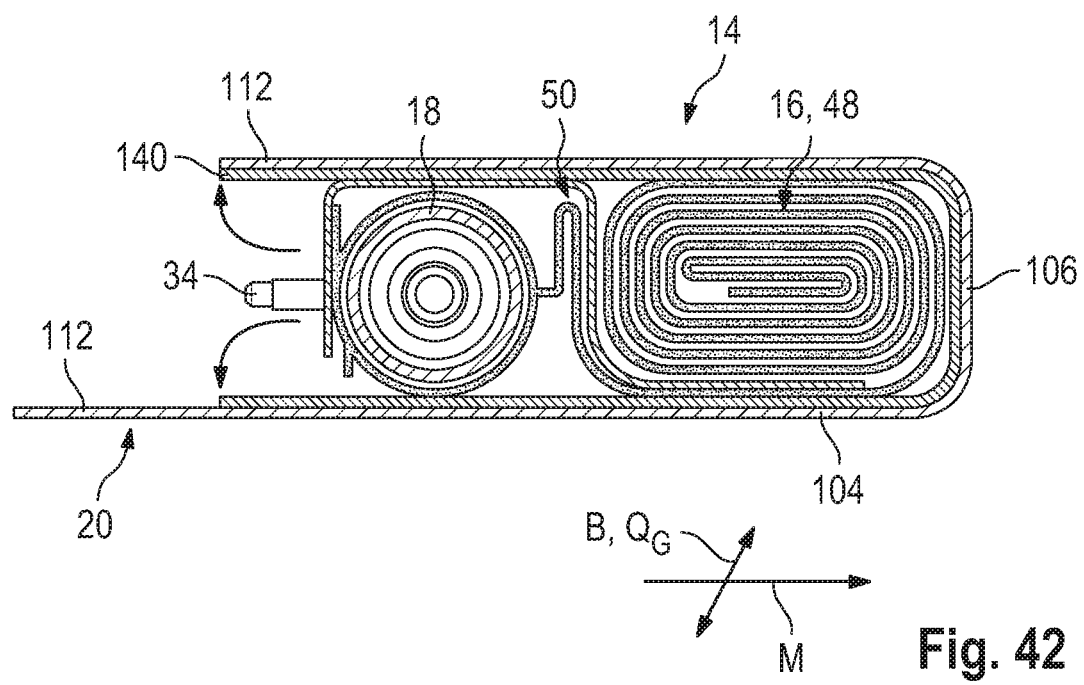

Now the intermediate cover 140 is opened again by the two ends thereof being removed from the bolts 34, 42 of the inflator 18. This is shown in FIG. 42.

Figure 43:
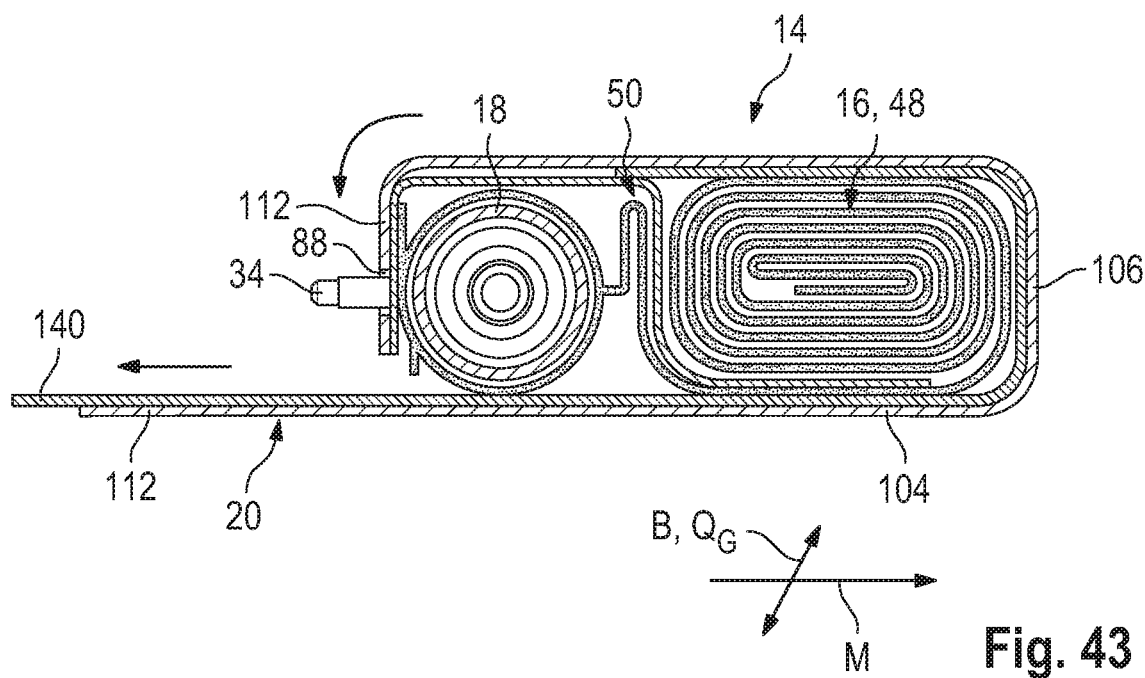
Figure 44:
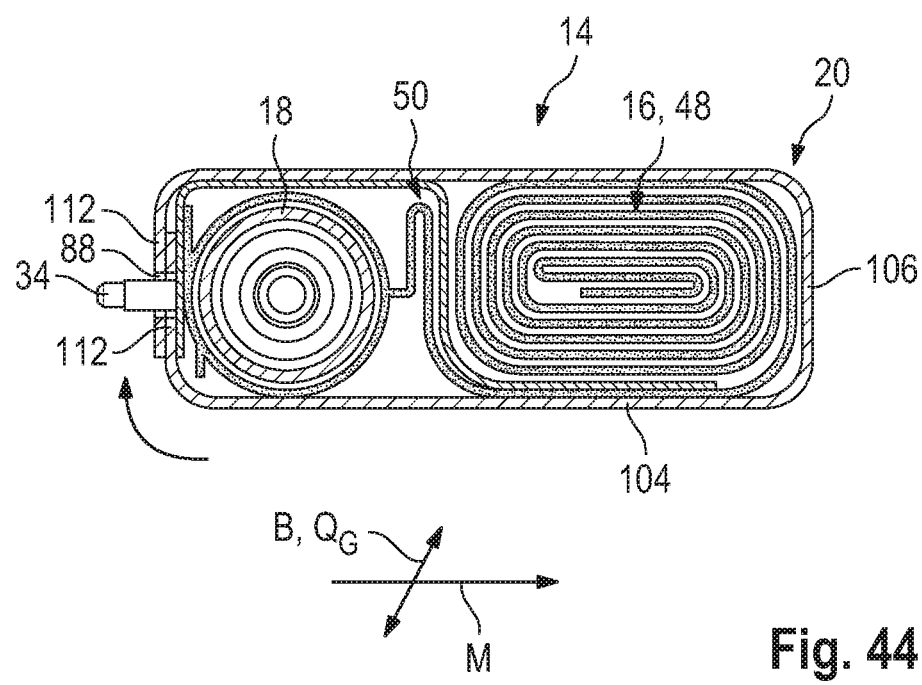

Either of the two retaining tabs 112 of the wrapping 20 is pulled over the bolts 34, 42 of the inflator 18 so as to fix the wrapping 20 to the inflator 18. Now the intermediate cover 140 can be removed from between the airbag package 14 and the wrapping 20, as illustrated in FIG. 43. In so doing, the folding especially of the connecting portion 50 cannot change any more, as the one retaining tab 112 already connected to the inflator 18 maintains the airbag package 14 in its desired shape.

After removing the intermediate cover 140 also the second retaining tab 112 is closed by the holes thereof being pulled over the bolts 34, 42 of the inflator 18.

Finally, the airbag package fixation 124 is closed by pulling the bracket 118 over the inflator 18 and the retaining tabs 112 surrounding the same, by sliding the web 122 beneath the second cut part 103 and by closing the fixing elements 126, 128, as described above.

The invention claimed is:

1. A vehicle occupant restraint system comprising an airbag module arranged beneath a roof liner of a vehicle in the area of a sun visor, the airbag module including an airbag and an inflator which upon activation supplies filling gas for the airbag, wherein prior to activation the airbag is folded to form an airbag package, the airbag package comprising a main package and a connecting portion, wherein the main package includes a restraint part of the airbag constituting a major part of the airbag volume, wherein the connecting portion comprises a neck of the airbag which connects the restraint part to the inflator, and wherein the restraint part is folded differently from the neck, wherein, in the longitudinal direction of the inflator, the main package is wider than the connecting portion, wherein the connecting portion has a length of about 5 cm to 50 cm, wherein the airbag includes a first free end of the restraint part, wherein prior to activation the first free end is fixed in the area of the inflator via a tether having a weakened zone, the tether being configured to remain intact at least until the neck is completely filled with gas.

2. The vehicle occupant restraint system according to claim 1, wherein the neck is folded into one to three zigzag folds.

3. The vehicle occupant restraint system according to claim 1, wherein in the unfolded and inflated airbag the neck is narrower, when viewed in the transverse vehicle direction, than the restraint part.

4. The vehicle occupant restraint system according to claim 1, wherein the folded connecting portion is arranged between the inflator and the main package.

5. The vehicle occupant restraint system according to claim 1, wherein the connecting portion and the main package are folded and arranged in the airbag package so that the main package will not deploy before it is completely located inside a vehicle interior.

6. The vehicle occupant restraint system according to claim 1, wherein the restraint part is both folded and rolled in the main package.

7. The vehicle occupant restraint system according to claim 1, wherein the airbag is a passenger airbag.

8. The vehicle occupant restraint system according to claim 1, wherein, when the airbag is folded to form the airbag package, the restraint part is folded so that the first free end of the restraint part is positioned proximate an inflation end of the airbag configured to receive inflation fluid from the inflator, and the folded restraint part being rolled up toward the neck.

9. The vehicle occupant restraint system according to claim 8, wherein the tether connects the first free end of the restraint part to the inflation end of the airbag, the tether being configured to release the connection of the first free end to the inflation end to allow the restraint part to unfold after unrolling.

10. The vehicle occupant restraint system according to claim 8, wherein the restraint part when folded is generally U-shaped and comprises an inner leg and an outer leg, wherein the inner leg is configured to inflate and deploy along a windshield, and the outer leg is configured to inflate and deploy along an instrument panel.

\* \* \* \* \*